(12) United States Patent
Furukawa et al.

(10) Patent No.: US 11,361,443 B2
(45) Date of Patent: Jun. 14, 2022

(54) IDENTIFYING DEVICE, LEARNING DEVICE, METHOD, AND STORAGE MEDIUM

(71) Applicants: RIKEN, Wako (JP); National University Corporation Tokai National Higher Education and Research System, Nagoya (JP)

(72) Inventors: Taiki Furukawa, Nagoya (JP); Hideo Yokota, Wako (JP); Shintaro Oyama, Nagoya (JP); Yoshinori Hasegawa, Nagoya (JP); Yoshimune Shiratori, Nagoya (JP)

(73) Assignees: RIKEN, Wako (JP); NATIONAL UNIVERSITY CORPORATION TOKAI NATIONAL HIGHER EDUCATION AND RESEARCH SYSTEM, Nagoya (JP)

( * ) Notice: Subject to any disclaimer, the term of this patent is extended or adjusted under 35 U.S.C. 154(b) by 31 days.

(21) Appl. No.: 16/877,678

(22) Filed: May 19, 2020

(65) Prior Publication Data
US 2020/0372650 A1    Nov. 26, 2020

(30) Foreign Application Priority Data

May 20, 2019    (JP) .............................. JP2019-094757

(51) Int. Cl.
*G06T 7/00* (2017.01)
*G06T 7/11* (2017.01)
*G06K 9/62* (2022.01)

(52) U.S. Cl.
CPC .......... *G06T 7/0014* (2013.01); *G06K 9/6267* (2013.01); *G06T 7/11* (2017.01);
(Continued)

(58) Field of Classification Search
CPC . G06T 2207/30096; G06T 2207/30061; G06T 2207/20081; G06T 7/11; G06T 7/0014; G06K 9/6267
See application file for complete search history.

(56) References Cited

U.S. PATENT DOCUMENTS

| 10,004,471 B2 * | 6/2018 | Madabhushi .......... A61B 6/032 |
| 10,121,243 B2 * | 11/2018 | Boroczky ................. G06T 7/48 |

(Continued)

FOREIGN PATENT DOCUMENTS

| JP | 2015136480 A | 7/2015 |
| JP | 2018097463 A | 6/2018 |
| WO | 2017150497 A1 | 9/2017 |

OTHER PUBLICATIONS

Travis, William D. et al.: "An Official American Thoracic Society /European Respiratory Society Statement: Update of the International Multidisciplinary Classification of the Idiopathic Interstitial Pneumonias", Am J Respir Crit Care Med, vol. 188, Iss. 6, pp. 733-748, Sep. 15, 2013.

(Continued)

*Primary Examiner* — Mia M Thomas
(74) *Attorney, Agent, or Firm* — NK Patent Law

(57) ABSTRACT

An aspect of the present invention allows for more accurately identifying a possible lesion in a human lung field. The aspect of the present invention includes an image obtaining section configured to obtain a chest cross-sectional image of a subject, a segmentation section configured to classify, into a plurality of segments, unit elements of the chest cross-sectional image, and an image dividing section configured to divide the chest cross-sectional image into a plurality of regions. A data deriving section is configured to derive data associated with the possible lesion, the data being derived on the basis of a segment of unit elements in the each region among the plurality of segments. An iden- (Continued)

tifying section is configured to output an identification result, which is a result of identification of the possible lesion in the lung field of the subject.

16 Claims, 8 Drawing Sheets

(52) U.S. Cl.
CPC .............. *G06T 2207/20021* (2013.01); *G06T 2207/20081* (2013.01); *G06T 2207/30061* (2013.01); *G06T 2207/30096* (2013.01)

(56) References Cited

U.S. PATENT DOCUMENTS

| | | | | |
|---|---|---|---|---|
| 10,692,211 | B2* | 6/2020 | Madabhushi | G06T 7/187 |
| 2015/0093007 | A1* | 4/2015 | Beaumont | G16Z 99/00 |
| | | | | 382/131 |
| 2017/0352157 | A1* | 12/2017 | Madabhushi | G06K 9/00147 |
| 2018/0144465 | A1* | 5/2018 | Hsieh | G06N 3/08 |
| 2018/0144466 | A1* | 5/2018 | Hsieh | G06N 3/04 |
| 2018/0242905 | A1* | 8/2018 | Madabhushi | G16H 50/20 |
| 2018/0325478 | A1* | 11/2018 | Li | G06T 7/33 |
| 2019/0019300 | A1* | 1/2019 | Simpson | G16H 30/20 |
| 2019/0066293 | A1* | 2/2019 | Wang | G06K 9/2054 |
| 2019/0156477 | A1* | 5/2019 | Perrin | G16H 15/00 |
| 2019/0254611 | A1* | 8/2019 | Madabhushi | G06K 9/4609 |
| 2020/0342606 | A1* | 10/2020 | Ichinose | G06N 3/08 |
| 2020/0380673 | A1* | 12/2020 | Wang | G06T 7/0014 |
| 2021/0166382 | A1* | 6/2021 | Kanada | G06K 9/6215 |
| 2021/0169349 | A1* | 6/2021 | Madabhushi | G06T 7/12 |

OTHER PUBLICATIONS

Raghu, Ganesh et al.: "Idiopathic pulmonary fibrosis in US Medicare beneficiaries aged 65 years and older incidence, prevalence, and survival, 2001-11", Lancet Respir Med 2014, vol. 2, pp. 566-572, May 27, 2014.

Raghu, Ganesh et al.: "An Official ATS/ERS/JRS/ ALAT Statement: Idiopathic Pulmonary Fibrosis: Evidence-based Guidelines for Diagnosis and Management", Am J Respir Grit Care Med, vol. 183. pp 788-824, 2011.

Walsh, Simon L.F. et al.: "Diagnostic accuracy of a clinical diagnosis of idiopathic pulmonary fibrosis: an international case-cohort study", Eur Respir J 2017; 50: 1700936, 10 pages.

Walsh, Simon L.F. et al.: "Multicentre evaluation of multidisciplinary team meeting agreement on diagnosis in diffuse parenchymal lung disease: a case-cohort study", Lancet Respir Med 2016; vol. 4, pp. 557-565, May 11, 2016.

Lee, Sang Hoon et al.: "Comparison of CPI and GAP models in patients with idiopathic pulmonary fibrosis: a nationwide cohort study", Scientific Reports, Mar. 19, 2018, 8:4784, 8 pages.

Omodaka, Kazuko et al.: "Classification of optic disc shape in glaucoma using machine learning based on quantified ocular parameters", PLOS ONE 12(12): e0190012, Dec. 19, 2017, 10 pages.

Sakai Y. et al.: "Automatic detection of early gastric cancer in endoscopic images using a transferring convolutional neural network", Annual International Conference of the IEEE Engineering in Medicine and Biology Society, pp. 4138-4141, Jul. 2018.

Pham, Hoa H. N. et al.: "Double Steps of Deep Learning Algorithm Decrease Error in Detection of Lymph Node Metastasis in Lung Cancer Patients", Journal of Pathology Informatics, 2019, Abstracts, pp. S25-S26.

Bartholmai, Brian J, M.D. et al.: "Quantitative CT Imaging of Interstitial Lung Diseases", JThorac Imaging, Sep. 2013, 28(5), 21 pages.

* cited by examiner

FIG. 7
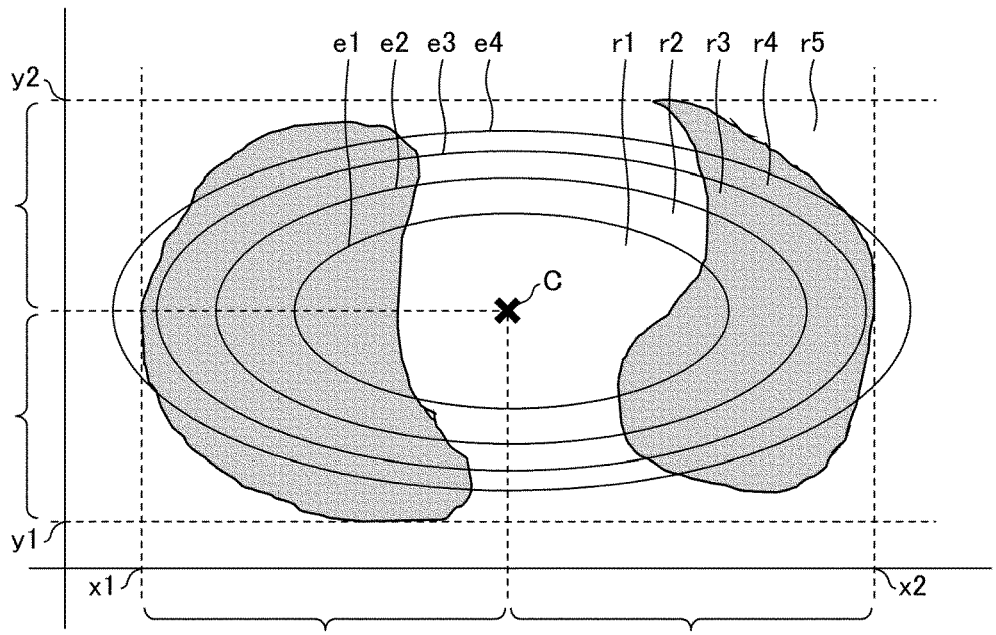
FIG. 8
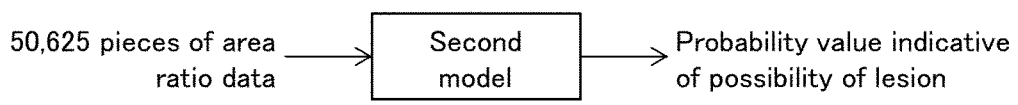
FIG. 9
| Percentage of correct answers of first model 121A | 96.4% |
|---|---|
|  | Accuracy | Sensitivity | Specificity | PPV | NPV | K |
|---|---|---|---|---|---|---|
| Second model 122A | 89.1 | 92.4 | 85.4 | 88.6 | 90.5 | 0.78 |
| Second model 122B | 90.7 | 94.3 | 86.4 | 89.4 | 92.9 | 0.81 |

IDENTIFYING DEVICE, LEARNING DEVICE, METHOD, AND STORAGE MEDIUM

CROSS REFERENCE TO RELATED APPLICATION(S)

This Nonprovisional application claims priority under 35 U.S.C. § 119 on Patent Application No. 2019-094757 filed in Japan on May 20, 2019, the entire contents of which are hereby incorporated by reference.

TECHNICAL FIELD

The present invention relates to a technique relevant to identification of a possible lesion in a human lung field, and also relates to a technique for causing a model for use in the identification of a possible lesion to learn.

BACKGROUND ART

There has been a demand for a technique for more accurately identifying a possible lesion in a human lung field. For example, idiopathic pulmonary fibrosis (IPF), which is a typical condition of interstitial pneumonia, is a poor-prognosis progressive disease and therefore, early diagnosis and early treatment is important. In an international guideline for diagnosis of IPF, it is specified that a final diagnosis is made through a multi-disciplinary discussion (MDD).

However, the number of specialists who can make such a MDD diagnosis is insufficient, and it is difficult to make a diagnosis only by a general pulmonologist. This is a problem. Meanwhile, in some cases, a surgical lung biopsy is needed prior to a MDD diagnosis. Although the surgical lung biopsy may result in death since the surgical lung biopsy is invasive, a pathological diagnostic concordance rate is low. This is another problem.

Non-Patent Literature 1 discloses a technique related to the above problems. Non-Patent Literature 1 discloses a technique for recognizing patterns of interstitial pneumonia by deep learning using high-resolution chest computed tomography (CT) images.

Patent Literature 1 also discloses a device which aids diagnosis of interstitial pneumonia. The device is configured to: obtain a chest tomographic image, which is obtained by capturing an image of a subject; extract, from the chest tomographic image, a lung periphery region at any specified depth from a pleura surface; obtain one or more feature amounts from the lung periphery region; and identify a lesion in the lung periphery region on the basis of the one or more feature amounts.

CITATION LIST

Non-Patent Literature

[Non-Patent Literature 1]

Bartholmai B J, Raghunath S, Karwoski R A, Moua T, Rajagopalan S, Maldonado F, Decker P A, and Robb R A, "Quantitative Computed Tomography Imaging of Interstitial Lung Diseases.", J Thorac Imaging 2013: 28(5): 298-307

Patent Literature

[Patent Literature 1]

International Publication No. WO 2017/150497 (Publication Date: Sep. 8, 2017)

SUMMARY OF INVENTION

Technical Problem

Although the technique disclosed in Non-Patent Literature 1 allows for recognition of a pattern(s) of interstitial pneumonia, for example, reticular shadows, ground glass opacities, and honeycombing, the possibility of a specific disease such as IPF needs to be identified by humans, with reference to the pattern(s) which has/have been recognized by the technique.

Further, according the technique disclosed in Patent Literature 1, although a lesion is identified on the basis of the one or more feature amounts in the lung periphery region, no region other than the lung periphery region is taken into consideration. Therefore, there has been a room for improvement in the technique disclosed in Patent Literature 1, from the viewpoint of accuracy of identification.

An object of an aspect of the present invention is to provide a technique for more accurately identifying a possible lesion in a human lung field.

Solution to Problem

In order to solve the above problems, an identifying device in accordance with an aspect of the present invention is an identifying device including: an image obtaining section configured to obtain a chest cross-sectional image of a subject; a segmentation section configured to classify, into a plurality of segments, unit elements of the chest cross-sectional image, the plurality of segments including a first segment indicating presence of a possible lesion in a lung field; an image dividing section configured to divide the chest cross-sectional image into a plurality of regions from a region showing a chest center to a region showing a chest periphery in n ways so as to obtain n sets of the plurality of regions, where n is an integer of not less than 2, the n sets of the plurality of regions being different from each other in at least one or both of (i) the number of divisional regions and (ii) positions of borders between adjacent regions; a data deriving section configured to derive data associated with the possible lesion, with regard to each region of the n sets of the plurality of regions, the data being derived on a basis of a segment of unit elements in the each region among the plurality of segments; and an identifying section configured to output an identification result, which is a result of identification of the possible lesion in the lung field of the subject with reference to the data derived from the each region included in the n sets of the plurality of regions.

In order to solve the above problems, a learning device in accordance with an aspect of the present invention is a learning device including: a training data obtaining section configured to obtain, as training data, an image showing at least a part of a chest cross-sectional image of a subject, the image having unit elements classified into a plurality of segments including a first segment indicating presence of a possible lesion in a lung field; and a first learning section configured to cause a first model to learn by using the training data so that in a case where the image showing at least the part of the chest cross-sectional image is inputted, the first model outputs the image having the unit elements classified into the plurality of segments including the first segment.

In order to solve the above problems, a learning device in accordance with an aspect of the present invention is a learning device including: a data obtaining section configured to obtain data associated with a possible lesion in a lung field, the data having been calculated on a basis of a segment of unit elements in each region of n sets of a plurality of regions into which a chest cross-sectional image of a subject is divided in n ways, where n is an integer of not less than 2, the plurality of regions being regions from a region showing a chest center to a region showing a chest periphery, the chest cross-sectional image having unit elements classified into a plurality of segments including a first segment indicating presence of the possible lesion, the segment of the unit elements in each region being among the plurality of segments, the n sets of the plurality of regions being different from each other in at least one or both of (i) the number of divisional regions and (ii) positions of borders between adjacent regions; and a second learning section configured to cause the second model to learn, the second model being configured to output an identification result as a result of identifying the possible lesion in the lung field of the subject in case where the data is inputted.

In order to solve the above problems, a method in accordance with an aspect of the present invention is a method of identifying a possible lesion of a subject by using an identifying device, the method including the steps of: obtaining a chest cross-sectional image of the subject; classifying, into a plurality of segments, unit elements of the chest cross-sectional image, the plurality of segments including a first segment indicating presence of the possible lesion in the lung field; dividing the chest cross-sectional image into a plurality of regions from a region showing a chest center to a region showing a chest periphery in n ways so as to obtain n sets of the plurality of regions, where n is an integer of not less than 2, the n sets of the plurality of regions being different from each other in at least one or both of (i) the number of divisional regions and (ii) positions of borders between adjacent regions; deriving data associated with the possible lesion, with regard to each region of the plurality of regions, the data being derived on a basis of a segment of unit elements in the each region among the plurality of segments; and outputting an identification result, which is a result of identification of the possible lesion in the lung field of the subject with reference to the data derived from the each region included in the plurality of regions.

In order to solve the above problems, a computer-readable storage medium in accordance with an aspect of the present invention is a computer-readable storage medium storing a program for causing a computer to function as the identifying device described above, the program causing the computer to function as each of the foregoing sections.

In order to solve the above problems, a method in accordance with an aspect of the present invention is a method of causing a first model to learn by using a learning device, the method including the steps of: obtaining, as training data, an image showing at least a part of a chest cross-sectional image of a subject, the image having unit elements classified into segments including a first segment indicating presence of a possible lesion in a lung field; and causing the first model to learn by using the training data so that in a case where the image showing at least the part of the chest cross-sectional image is inputted, the first model outputs the image having the unit elements classified into the plurality of segments including the first segment.

In order to solve the above problems, a computer-readable storage medium in accordance with an aspect of the present invention is a computer-readable storage medium storing a program for causing a computer to function as the learning device described above, the program causing the computer to function as each of the foregoing sections.

In order to solve the above problems, a method in accordance with an aspect of the present invention is a method of causing a second model to learn by using a learning device, the method including the steps of: obtaining data associated with a possible lesion in a lung field, the data having been calculated on a basis of a segment of unit elements in each region of n sets of a plurality of regions into which a chest cross-sectional image of a subject is divided in n ways, where n is an integer of not less than 2, the plurality of regions being regions from a region showing a chest center to a region showing a chest periphery, the unit elements being unit elements of the chest cross-sectional image classified into a plurality of segments including a first segment indicating presence of the possible lesion, the segment of the unit elements in each region being among the plurality of segments, the n sets of the plurality of regions being different from each other in at least one or both of (i) the number of divisional regions and (ii) positions of borders between adjacent regions; and causing the second model to learn, the second model being configured to output an identification result as a result of identifying the possible lesion in the lung field of the subject in case where the data is inputted.

In order to solve the above problems, a computer-readable storage medium in accordance with an aspect of the present invention is a computer-readable storage medium storing a program for causing a computer to function as the learning device described above, the program causing the computer to function as each of the foregoing sections.

In order to solve the above problems, a computer-readable storage medium in accordance with an aspect of the present invention is a computer-readable storage medium storing a learned model for causing a computer to function to output an image having unit elements classified into a plurality of segments including a first segment indicating presence of a possible lesion in a lung field, in a case where at least a part of a chest cross-sectional image of a subject is inputted, the learned model including parameters which have learned by using, as training data, an image to which segmentation information is attached, the image showing at least the part of the chest cross-sectional image of the subject, the segmentation information indicating the plurality of segments including the first segment, the parameters having learned so as to reduce a difference between (i) the image which is outputted by the learned model and in which the unit elements are classified and (ii) the image, to which the segmentation information is attached, in the training data.

In order to solve the above problems, a computer-readable storage medium in accordance with an aspect of the present invention is a computer-readable storage medium storing a learned model for causing a computer to function to output an identification result associated with a possible lesion in a lung field of a subject, in a case where data derived on a basis of a plurality of segments including a first segment indicating presence of the possible lesion in the lung field is inputted, the data being derived from each region of a plurality of regions into which a chest cross-sectional image of the subject is divided in n ways so that n sets of the plurality of regions are obtained, where n is an integer of not less than 2, the plurality of regions being regions from a region showing a chest center to a region showing a chest periphery, the n sets of the plurality of regions being different from each other in at least one or both of (i) the number of divisional regions and (ii) positions of borders between adjacent regions.

Advantageous Effects of Invention

An aspect of the present invention makes it possible to provide a technique for more accurately identifying a possible lesion in a human lung field.

BRIEF DESCRIPTION OF DRAWINGS

FIG. 7 is a diagram schematically illustrating a specific example of an operation in which a chest cross-sectional image is divided into a plurality of regions in Embodiment 1 of the present application.

FIG. 8 is a diagram schematically illustrating a specific example of an operation in which an identification result is outputted in Embodiment 1 of the present application.

FIG. 9 is a chart illustrating accuracy of the identifying device in accordance with Embodiment 1 of the present invention.

DESCRIPTION OF EMBODIMENTS

Embodiment 1

The following will describe in detail an identifying device 1 in accordance with Embodiment 1 of the present invention. The identifying device 1 is a device configured to obtain a chest cross-sectional image(s) of a subject and to output an identification result, which is a result of identification of a possible lesion in a lung field of the subject.

<Configuration of Identifying Device>

Figure 1:
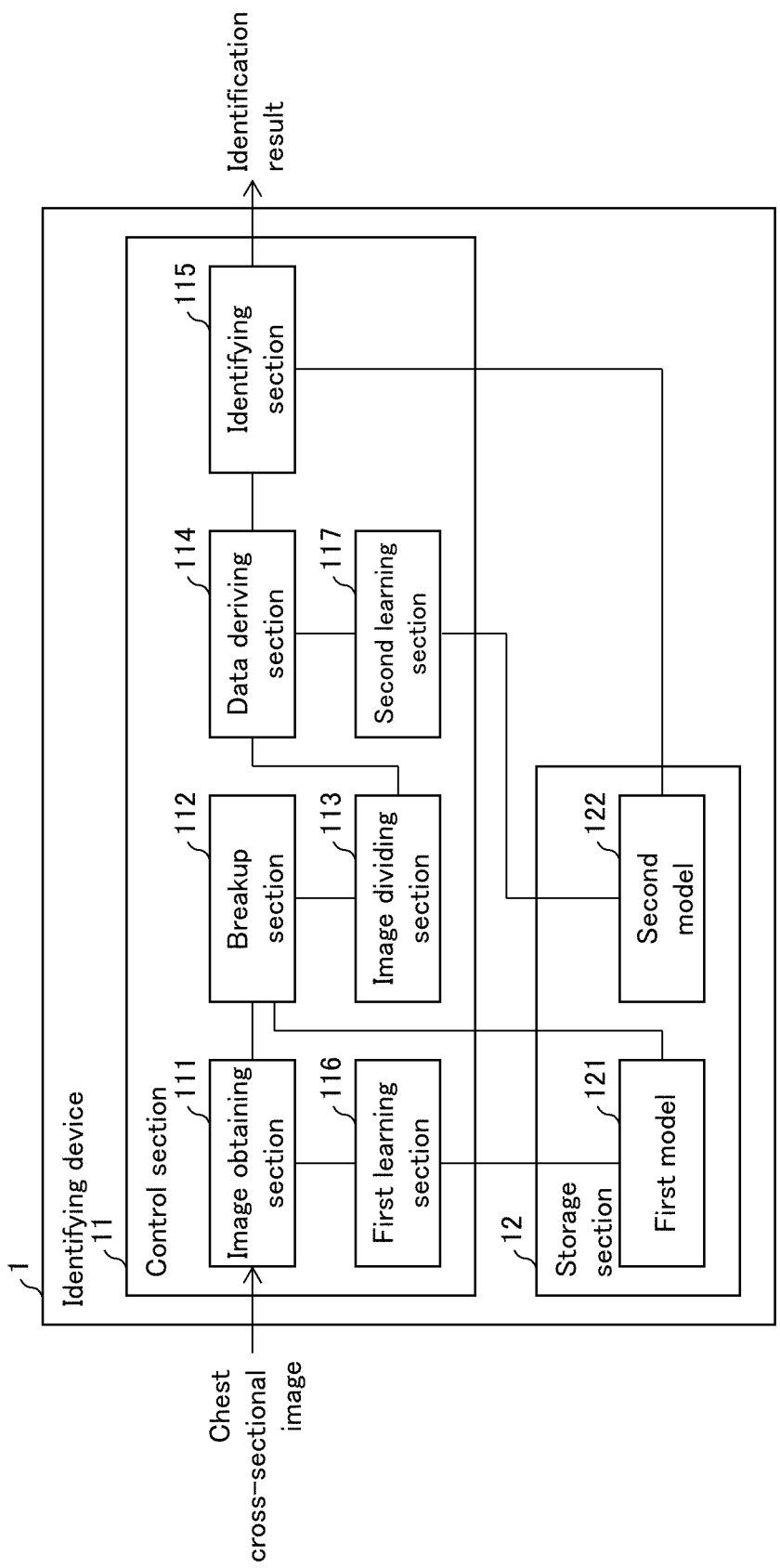
FIG. 1 is a block diagram illustrating a functional configuration of an identifying device in accordance with Embodiment 1 of the present invention.

FIG. 1 is a block diagram illustrating a functional configuration of the identifying device 1. In FIG. 1, the identifying device 1 includes a control section 11 and a storage section 12. The control section 11 includes an image obtaining section 111, a breakup section 112, an image dividing section 113, a data deriving section 114, an identifying section 115, a first learning section 116, and a second learning section 117. In the storage section 12, a first model 121 and a second model 122 are stored.

The image obtaining section 111 obtains a chest cross-sectional image(s) of a subject. The chest cross-sectional image is, for example, a computed tomography (CT) image which is obtained by a CT device. More specifically, the image obtaining section 111 obtains m chest cross-sectional images (where m is an integer of not less than 2) of a subject from among a plurality of chest cross-sectional images obtained by capturing images of the chest of the subject with a predetermined slice thickness.

The breakup section 112 determines which one of a plurality of categories each of unit elements obtained by breaking up each of the chest cross-sectional images belongs to. The plurality of categories include a first category and a second category. In Embodiment 1, each of the unit elements corresponds to one pixel. The first category is a category which indicates the presence of a possible lesion associated with a specific disease in a lung field. In Embodiment 1, the specific disease is idiopathic pulmonary (IPF). Hereinafter, the first category will be also referred to as "IPF image". The second category is a category which indicates the presence of a possible lesion that is associated with a disease different from the specific disease in the lung field. Hereinafter, the second category will be also referred to as "Non-IPF image". In other words, the "Non-IPF image" is a category which indicates a possible interstitial pneumonia that is different from IPF. Further, the plurality of categories may include another category in addition to the first category and the second category. Note that in the following description, the "category" may be also referred to as a "segment".

Further, the breakup section 112 determines a category of each pixel, by using the first model 121 which is stored in the storage section 12. The first model 121 is a model which has learned so as to output one of the plurality of categories for each pixel in an input image in a case where at least a part of the chest cross-sectional image is inputted. The first model 121 is, for example, a model generated by deep learning. The first model 121 is a model which has been caused to learn by the first learning section 116 (later described). Details of leaning of the first model 121 will be described in detail later. Note that the first model 121 corresponds to one example of learned models in embodiments of the present invention.

The chest cross-sectional image which is inputted to the first model 121 here is desirably an image which is pre-processed after the image has been obtained by the image obtaining section 111. Such pre-processing may be, for example, rotation, feathering, and noise removal, but is not limited to these examples.

Further, the breakup section 112 can determine which one of the plurality of categories each pixel belongs to, with regard to each partial image constituting the each chest cross-sectional image. Specifically, the breakup section 112 breaks up, into partial images, the each chest cross-sectional image which is pre-processed as described above. In this case, the first model 121 is supposed to have learned so as to output one of the plurality of categories, for each pixel in a partial image constituting a chest cross-sectional image, in a case where the partial image is inputted.

Note that such breakup processing carried out by the breakup section 112 is not an essential configuration. The breakup section 112 can be more generically expressed as a segmentation section which is configured to classify unit elements of the chest cross-sectional image into a plurality of segments which include a first segment indicating the presence of a possible lesion in a lung field.

The image dividing section 113 divides the each chest cross-sectional image into a plurality of regions from a region showing a chest center to a region showing a chest periphery. For example, the image dividing section 113 can divide the each chest cross-sectional image into two regions including (i) an inner region containing a chest center and (ii) an outer region containing a chest periphery. Alternatively, the image dividing section 113 can divide the each chest cross-sectional image into three regions including (i) an inner region containing a chest center, (ii) an outer region containing a chest periphery, and (iii) an intermediate region sandwiched between the inner region and the outer region.

In this way, the image dividing section 113 divides the each chest cross-sectional image into a plurality of regions in n ways (where n is an integer of not less than 2) so as to obtain n sets of the plurality of regions. The n sets of the plurality of regions are different from each other in at least one or both of (i) the number of divisional regions and (ii) positions of borders between adjacent regions. The number of regions should be an integer of not less than 2. Meanwhile, even in a case where the chest cross-sectional image is divided into the same number of divisional regions, different sets of the plurality of regions are generated if positions of borders between adjacent regions of the plurality of regions are different. The n sets of the plurality of regions are also referred to as n division patterns.

The data deriving section 114 derives data associated with the possible lesion, with regard to each region of the plurality of regions in the n division patterns. The data here is derived on the basis of categories which are determined for respective pixels in the each region of the plurality of regions. In Embodiment 1, the data associated with the possible lesion is an area ratio data. The area ratio data shows an area ratio between (i) pixels which are determined to belong to the IPF image in the region and (ii) pixels which are determined to belong to the Non-IPF image in that region.

In this case, with regard to a certain division pattern, d area ratios are calculated, where d is a number equal to the number of divisional regions. In this calculation, the data deriving section 114 may weight, in accordance with a distance from the region to the chest periphery (or the chest center), the area ratio which is derived from each region. For example, in a case where the specific disease is IPF, the area ratios may be weighted more as the distance from the region to the chest periphery becomes shorter. Alternatively, the area ratios may be weighted as the distance from the region to the chest center becomes shorter. Note that a weighting method is not limited to those described above.

Meanwhile, since each of m chest cross-sectional images has n division patterns, the number of combinations of the division patterns of the m chest cross-sectional images becomes $n^m$ ("^" represents a power). In this case, the area ratio data derived with regard to a certain combination contains (d1+d2+ . . . +dm) area ratios. Note that di (where i is an integer of not less than 1 and not more than m) represents the number of divisional regions in division patterns of an i-th chest image contained in the aforesaid certain combination. In this way, the data deriving section 114 derives $n^m$ pieces of area ratio data.

The identifying section 115 outputs an identification result, which is a result of identification of the possible lesion in the lung field of the subject with reference to the data derived from the each region included in the plurality of regions. In Embodiment 1, the identification result indicates the possibility of IPF in the lung field of the subject. The identification result can be, but is not limited to, information indicating whether or not the subject has IPF or a probability value indicative of the possibility of IPF. In other words, the identifying section 115 outputs the identification result, with reference to the $n^m$ pieces of the area ratio data. Specifically, the identifying section 115 outputs the identification result by using the second model 122 which is stored in the storage section 12. The second model 122 is a learned model configured to output the identification result indicative of the possibility of IPF in the lung field of the subject in a case where the area ratio data derived from each of the plurality of regions is inputted. The second model 122 is, for example, a model generated by machine learning which is different from deep learning. The second model 122 is a model which has been caused to learn by the second learning section 117 (later described). Details of leaning of the second model 122 will be described in detail later. Note that the second model 122 corresponds to one example of learned models in embodiments of the present invention.

Further, the identifying section 115 can output the identification result, further with reference to clinical data of the subject in addition to the area ratio data described above. For example, the identifying section 115 can use, as the second model 122, a model which has learned by using, as an input, clinical data in addition to the above-described data. Alternatively, the identifying section 115 can output the identification result, with reference to the clinical data and information which is outputted from the second model having learned by using the above-described data as an input.

The first learning section 116 causes the first model 121 to learn by using training data. As a learning algorithm, it is possible to apply a well-known learning algorithm which uses training data.

The training data is obtained by the image obtaining section 111. In Embodiment 1, the training data is a partial image of the chest cross-sectional image of the subject. In the partial image, classification information is attached to each pixel. The classification information indicates which one of the plurality of categories described above each pixel in the partial image belongs to. The training data is generated, for example, by a specialist skilled in diagnosis of interstitial pneumonia. For example, the specialist attaches, to each pixel in a partial image of the chest cross-sectional image which has been pre-processed as described above, classification information indicating a corresponding one of the plurality of categories. Specifically, the specialist attaches classification information indicating one of the plurality of categories, with reference to a pattern of a lung disease (e.g., honeycombing or traction bronchiectasis) in the chest cross-sectional image and a result of MDD diagnosis. This generates, for each pixel in the partial image, data in which information for identifying the each pixel and the classification information are associated with each other. Hereinafter, a state in which classification information is attached is also expressed as "labeled".

The first learning section 116 causes the first model 121 to learn by using a labeled partial image of the chest cross-sectional image. Specifically, the first learning section 116 causes parameters of the first model 121 to learn, by using the training data, so as to reduce a difference between a category outputted by the first model and the classification information in the training data.

The first model 121 which has learned is stored in the storage section 12 as a model which is configured to output one of the plurality of categories for each pixel in a partial image of the chest cross-sectional image in a case where the partial image is inputted. As a result, a pixel determined to belong to the "IPF image" according to an output from the first model indicates a pixel which is highly likely to be determined to belong to the "IPF image" by a specialist with reference to a lung disease pattern (e.g., honeycombing or traction bronchiectasis) in the chest cross-sectional image.

Here, learning of the first model by using a labeled partial image of the chest cross-sectional image as the training data is advantageous since such learning reduces processing load for learning and increases the number of training data, as compared to learning by using a labeled image of the whole of the chest cross-sectional image.

The second learning section 117 causes the second model 122 to learn. In learning of the second model 122, it is possible to use a learning algorithm which requires training data or a learning algorithm which does not require any training data. In Embodiment 1, the second model 122 is caused to learn by using training data. In this case, in order to generate the training data, the second learning section 117 obtains information indicating a possible lesion of a subject (i.e., diagnosis contents of the subject). It is desirable that the diagnosis contents of the subject are generated, for example, by a specialist skilled in diagnosis of interstitial pneumonia. For example, the diagnosis contents may indicate whether or not the subject has IPF.

In this way, the second learning section 117 causes the second model to learn by using, as the training data, data in which the diagnosis contents obtained above are associated with the n^m pieces of area ratio data generated by the data deriving section 114. Specifically, the second learning section 117 causes parameters of the second model 122 to learn by using, as the training data, data to which identification result information (specifically, the diagnosis contents obtained as described above) indicative of the possible lesion is attached to each of the n^m pieces of the area ratio data. The second model 122 is caused to learn here so as to reduce a difference between an identification result outputted by the second model 122 and the identification result information in the training data.

Here, use of the n^m pieces of the area ratio data as an input to the second model 122 is advantageous since the use of the n^m pieces of the area ratio data as the input improves identification accuracy by using the second model with use of more area ratio data. The second model 122 which has learned is stored in the storage section 12, as a model which is configured to output an identification result indicative of the possibility of IPF in a case where area ratio data is inputted.

Further, in order to cause the second model 122 to learn, the second learning section 117 can use the clinical data of the subject in addition to the n^m pieces of the area ratio data. The clinical data of the subject can be, for example, age, sex, etc. of the subject, but is not limited to these examples. In this case, the second model 122 is stored in the storage section 12, as a model which is configured to output an identification result indicative of the possibility of IPF in a case where the area ratio data and the clinical data are inputted.

<Operations of Identifying Device>

(Operation for Identifying Possible Lesion in Lung Field of Subject)

Figure 2:
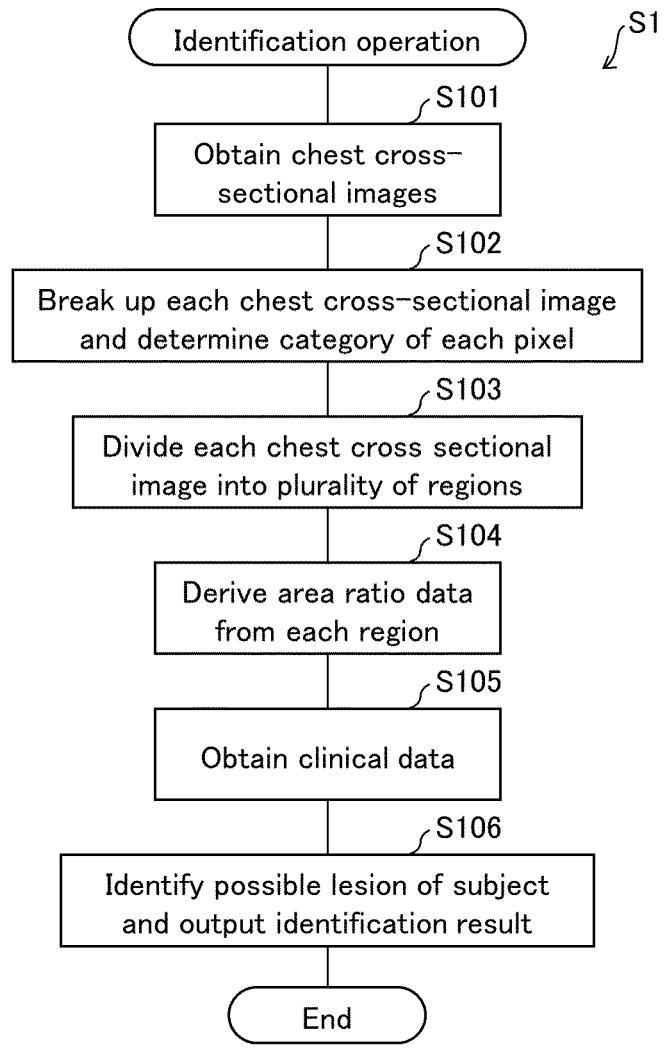
FIG. 2 is a flowchart illustrating an operation in which the identifying device in accordance with Embodiment 1 of the present invention identifies a possible lesion in a lung field of a subject.

FIG. 2 is a flowchart illustrating an identification process S1 in which the identifying device 1 identifies a possible lesion in a lung field of a subject.

In step S101, the image obtaining section 111 obtains m chest cross-sectional images of the subject.

In step S102, the breakup section 112 determines which category among the plurality of categories including the IPF image and the Non-IPF image each pixel in each of the chest cross-sectional images belongs to. Specifically, the breakup section 112 determines a category of each pixel, by inputting, to the first model 121, partial images obtained by breaking up each of the chest cross-sectional images which have been pre-processed. Hereinafter, pixels determined to belong to the IPF image will be each also referred to as a pixel indicative of the IPF image. Meanwhile, hereinafter, pixels determined to belong to the Non-IPF image will be each also referred to as a pixel indicative of the Non-IPF image.

In step S103, the image dividing section 113 divides each of the chest cross-sectional images in n division patterns (into a plurality of regions).

In step S104, the data deriving section 114 derives area ratio data for each of n^m combinations of division patterns. The area ratio data includes an area ratio between (i) pixels indicative of the IPF image and (ii) pixels indicative of the Non-IPF image, which area ratio is calculated for each of the plurality of regions in each of the chest cross-sectional images. Note that in this step, the data deriving section 114 may weight each area ratio constituting the area ratio data, in accordance with a distance to the chest center (or the chest periphery) from a region corresponding to the area ratio.

In step S105, the identifying section 115 obtains clinical data of the subject.

In step S106, the identifying section 115 outputs an identification result indicative of the possibility of IPF, with reference to the area ratio data and the clinical data. Specifically, the identifying section 115 outputs the identification result, by inputting n^m pieces of the area ratio data and the clinical data to the second model.

Note that in this step S106, the identifying section 115 may input, to the second model, the n^m pieces of the area ratio data but no clinical data. In this case, it is not necessary to carry out processing of the step S105.

Here, the identifying device 1 ends the identification process S1.

(Operation for Learning of First Model)

Figure 3:
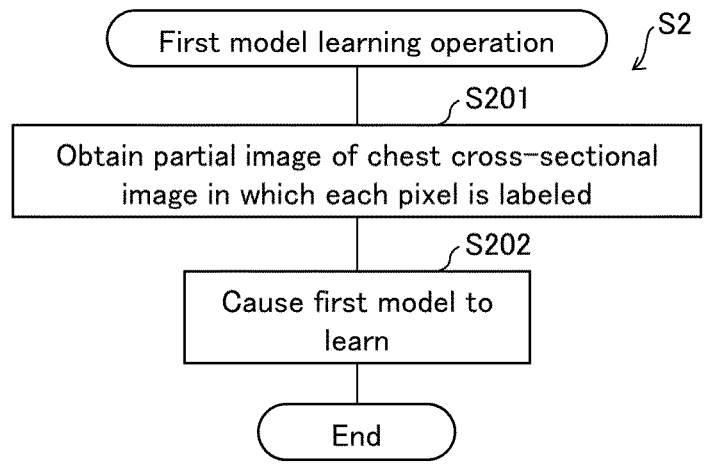
FIG. 3 is a flowchart illustrating an operation in which the identifying device in accordance with Embodiment 1 of the present invention learns a first model.

FIG. 3 is a flowchart illustrating a first learning process S2 in which the identifying device 1 causes the first model to learn.

In step S201, the image obtaining section 111 obtains, as training data, a labeled partial image of a chest cross-sectional image. The labeled partial image is an image in which one of a plurality of categories including the IPF image and the Non-IPF image is attached to each pixel. Note that the labeled partial image is a partial image which is obtained by (i) dividing the chest cross-sectional image which has been pre-processed and (ii) then attaching one of the plurality of categories to each pixel in the partial image.

In step S202, the first learning section 116 causes the first model to learn by using the training data thus obtained.

On completion of S202, the identifying device 1 ends the first learning process S2.

(Operation of Learning of Second Model)

Figure 4:
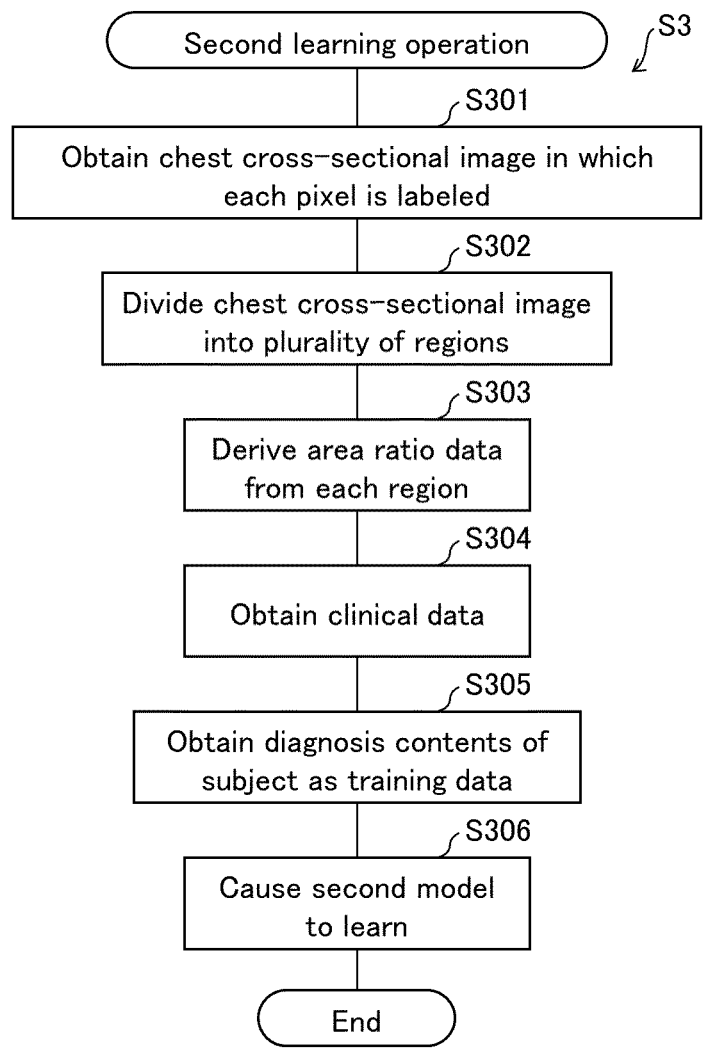
FIG. 4 is a flowchart illustrating an operation in which the identifying device in accordance with Embodiment 1 of the present invention learns a second model.

FIG. 4 is a flowchart illustrating a second learning process S3 in which the identifying device 1 causes the second model to learn.

In step S301, the image obtaining section 111 obtains m labeled chest cross-sectional images of the subject. The labeled chest cross-sectional images each can be constituted by using the labeled partial image obtained in step S201 in FIG. 3.

In step S302, the image dividing section 113 divides each of the chest cross-sectional images in n division patterns (into a plurality of regions).

In step S303, the data deriving section 114 derives area ratio data for each of n^m combinations of division patterns. Note that in this step, the data deriving section 114 may weight each area ratio constituting a piece of the area ratio data, in accordance with a distance to the chest center (or the chest periphery) from a region corresponding to the area ratio.

In step S304, the second learning section 117 obtains the clinical data of the subject.

In step S305, the second learning section 117 obtains, as training data, diagnosis contents of the subject.

In step S306, the second learning section 117 causes the second model to learn by using n^m pieces of the area ratio data, the clinical data, and the diagnosis contents of the subject, which were obtained in steps S303 to S305.

Note that in step S306, the second learning section 117 may cause the second model to learn by using the n^m pieces of the area ratio data and the diagnosis contents of the subject without use of the clinical data. In this case, it is not necessary to carry out processing of step S304.

On completion of step S306, the identifying device 1 ends the second learning process S3.

SPECIFIC EXAMPLES

Specific Example of Step S101

Figure 5:
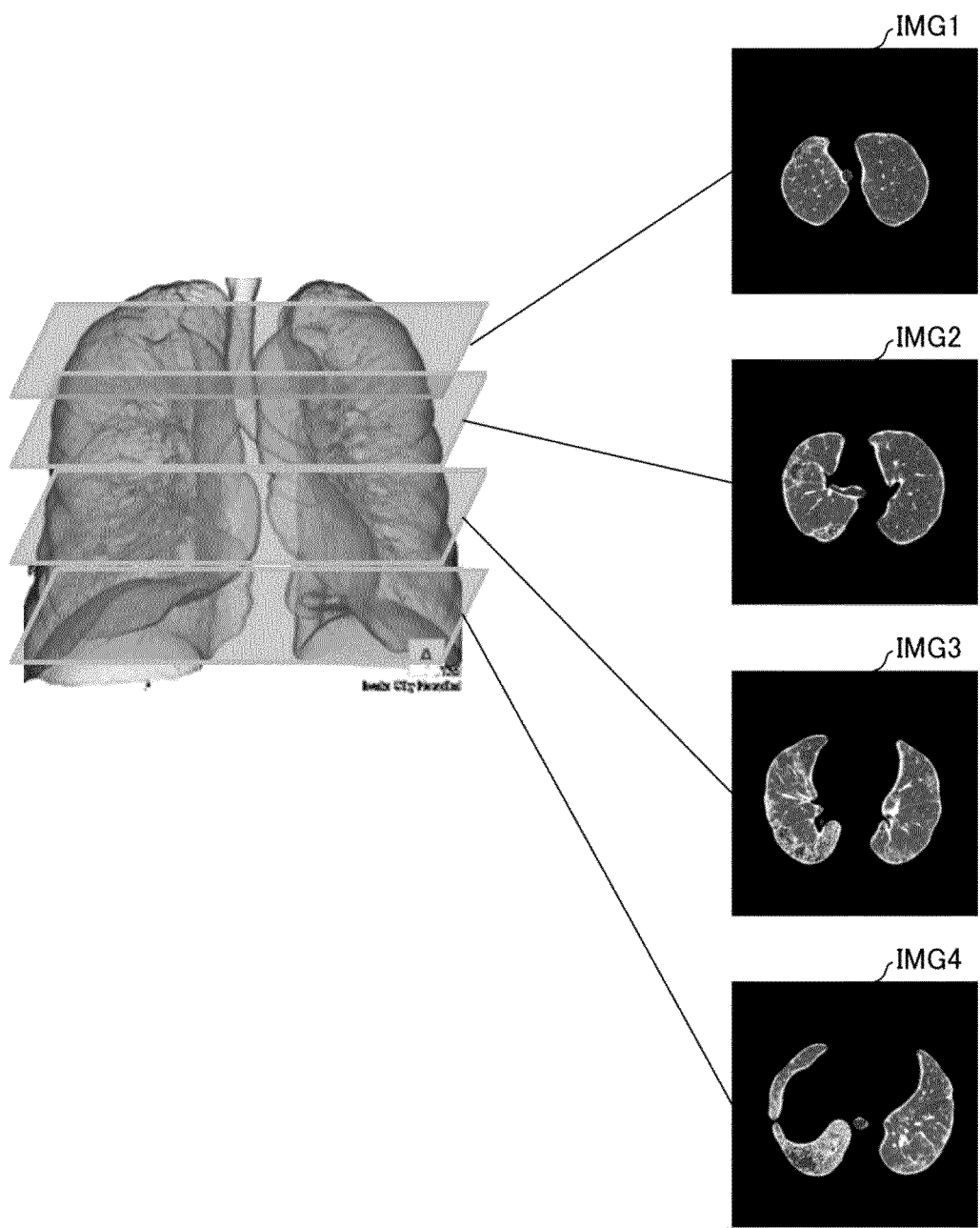
FIG. 5 is a diagram schematically illustrating a specific example of an operation in which chest cross-sectional images are obtained in Embodiment 1 of the present application.

FIG. 5 is a diagram schematically illustrating a specific example of the chest cross-sectional images which are obtained in step S101 of FIG. 2. In this specific example, the number (m) of the chest cross-sectional images to be obtained is 4 (m=4). Specifically, four chest cross-sectional images IMG1 to IMG4 are obtained from among a plurality of chest cross-sectional images which are obtained by capturing images with a slice thickness of 0.5 mm. These four chest cross-sectional images IMG1 to IMG4 show an upper lung field, a middle lung field, a lower lung field, and a lung bottom, respectively. Hereinafter, the chest cross-sectional images IMG1 to IMG4 will be also referred to simply as a chest cross-sectional image IMG in a case where it is not necessary to specifically distinguish the chest cross-sectional images IMG1 to IMG4 from each other.

Specific Example of Step S102

Figure 6:
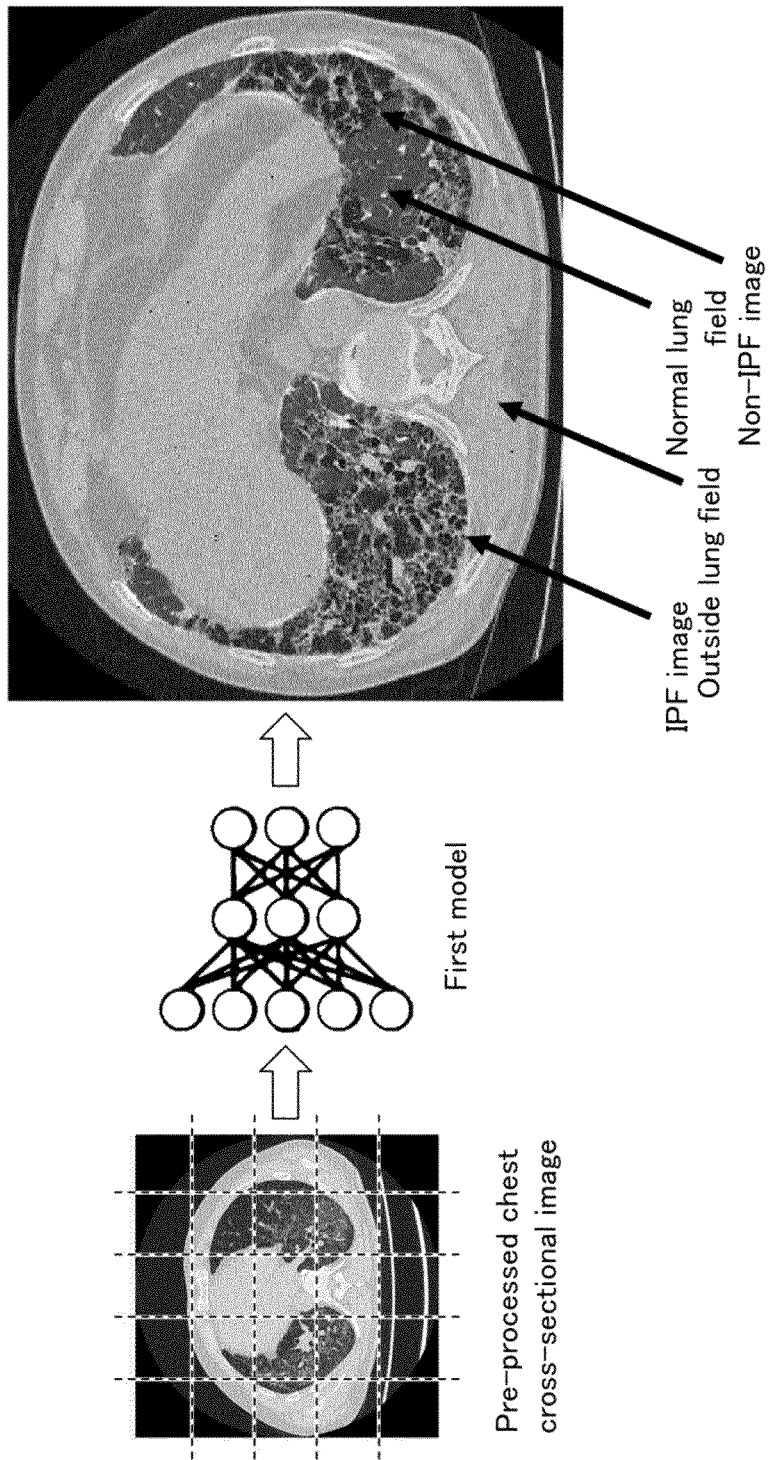
FIG. 6 is a diagram schematically illustrating a specific example of an operation in which a category is determined for each unit element obtained as a result of breakup in Embodiment 1 of the present invention.

FIG. 6 is a diagram schematically illustrating a specific example of determination of a category for each pixel in step S102 of FIG. 2. In this specific example, the chest cross-sectional image IMG is subjected to pre-processing including conversion to an x-ray absorption value (Hounsfield Unit (HU) number), rotation, feathering, and/or the like. Further, each of the chest cross-sectional images thus pre-processed is divided into 5 (vertical) by 5 (horizontal) blocks, that is, into 25 partial images.

As a result of input of each of the partial images to the first model, a category of each pixel in each partial image is determined from among four categories including "IPF image", "Non-IPF image", "normal lung field", and "outside lung field". In the present specific example, the above four categories are used as the plurality of categories. In other words, the plurality of categories include "normal lung field" and "outside lung field" as other categories, in addition to "IPF image" which is the first category and "Non-IPF image" which is the second category. The category "normal lung field" is a category which indicates a normal lung field which does not have any possible lesion. The category "outside lung field" is a category which indicates the outside of the lung field.

Specific Example of Step S103

FIG. 7 is a diagram schematically illustrating a specific example of n division patterns (a plurality of regions) into which each of the chest cross-sectional images are divided in step S103. In the present specific example, n=15. Accordingly, 15 division patterns are generated.

In the description here, it is assumed that each pixel of the chest cross-sectional image IMG is represented by two-dimensional coordinates (x, y). In FIG. 7, a range of the lung field is expressed by $x1<x<x2$ and $y1<y<y2$. In this case, the coordinates of a lung field center C is expressed as $((x1+x2)/2, (y1+y2)/2)$.

In the chest cross-sectional image IMG, the image dividing section 113 generates concentric ellipses e1 to e4 having the lung field center C at the center of these ellipses. These four ellipses may be spaced apart from each other at equal or different intervals. The four ellipses e1 to e4 serve as respective border lines which divide, into 5 regions r1 to r5 from a region including the lung field center C to a region including a lung field periphery. The image dividing section 113 selects one of the four ellipses e1 to e4, and generates 15 division patterns which are different from each other in at least one or both of (i) the number of divisional regions and (ii) positions of borders between adjacent ones of the plurality of regions.

For example, in generation of division patterns in a case where the number of divisional regions is 2, there is one border line between 2 regions. Therefore, one of the four ellipses e1 to e4 should be selected and used as the border line. For example, in a case where the ellipse e1 is selected as the border line, a region including the lung field center C (inner region) is constituted by a region r1 and a region including the lung field periphery (outer region) is constituted by regions r2 to r5. The division patterns generated in the case of the other number of divisional regions are similarly described. In other words, the number of division patterns corresponding to each number of divisional regions is as follows.

In a case where the number of divisional regions is 2, there are $_4C_1=4$ division patterns.
In a case where the number of divisional regions is 3, there are $_4C_2=6$ division patterns.
In a case where the number of divisional regions is 4, there are $_4C_3=4$ division patterns.
In a case where the number of divisional regions is 5, there are $_4C_4=1$ division patterns.

In this way, the image dividing section 113 generates 15 division patterns in total for each chest cross-sectional image IMG, by using, as the border line, one or more of the four ellipses e1 to e4. Meanwhile, since each of the four chest cross-sectional images has 15 division patterns, there are $15^4=50,625$ combinations of the division patterns of the four chest cross-sectional images.

Specific Examples of Steps S104 and S105

FIG. 8 is a diagram schematically illustrating specific examples of steps S104 and S105.

In step S104, the data deriving section 114 derives respective pieces of area ratio data for the 50,625 combinations of the division patterns as described with reference to FIG. 7. Assume, for example, that in a combination, the division patterns of a case where the number of division regions is 3 are generated in the chest cross-sectional image IMG1. Meanwhile, it is assumed that the ellipses e1 and e2 are selected as the border lines. In this case, the following area ratios between pixels indicative of the IPF image and pixels indicative of the Non-IPF are derived: the area ratio in an inner region (constituted by a region r1); the area ratio in an intermediate region (constituted by the region r2); and the area ratio in an outer region (constituted by regions r3 to r5). When the division patterns of the case where the number of divisional regions is 3 are combined similarly in each of the other chest cross-sectional images IMG2 to IMG4, three area ratios are derived from each of the other chest cross-sectional images IMG2 to IMG4. Therefore, the area ratio data of the above combination is constituted by 12 area ratios.

In step S105, the identifying section 115 inputs, to the second model, 50,625 pieces of area ratio data like the area ratio data described above, and obtains an identification result which is outputted from the second model. In the present specific example, the identification result is a probability value indicative of the possibility of IPF in the subject.

This is the end of the description of the specific examples.

<Example of Learning of First Model>

The following will discuss an Example in which the first model is generated by using the identifying device 1.

In step S201, the image obtaining section 111 obtained the training data concerning 644 examples.

(Details of Chest Cross-Sectional Image)

Specifically, the image obtaining section 111 obtained four chest cross-sectional images of each of 644 examples so as to generate the training data. The four chest cross-sectional images included images of an upper lung field, a middle lung field, a lower lung field, and a lung bottom, and were obtained from high-definition CT images of a lung field whose images were captured with a slice thickness of 0.5 mm. Details of each of the four chest cross-sectional image are as follows.

Image size: 512 pixels×512 pixels
Pixel value: 16 bits (Details of Pre-Processing)

In pre-processing prior to learning in step S202, the image obtaining section 111 converted pixel values in each of the chest cross-sectional images to HU values. In conversion to the HU values, noise was removed by converting HU>350 to HU=350. As a result of this pre-processing, a range of the HU values in the chest cross-sectional image after conversion was arranged to be a range of −1850 to 350. This range is suitable for viewing lung field images.

The image obtaining section 111 also carried out, as other pre-processing with respect to each of the chest cross-sectional images, rotation for making an orientation of the lung field identical in the chest cross-sectional images, feathering, and/or the like as appropriate.

(Details of Partial Images)

Further, the image obtaining section 111 divided each of the chest cross-sectional images into 5 (vertical) by 5 (horizontal) blocks, that is, into 25 partial images in total. Each of the partial images has a size of 100 pixels×100 pixels.

(Obtaining Label)

The image obtaining section 111 obtained one of "IPF image", "Non-IPF image", "normal lung field", and "outside lung field", as a label for each pixel in each of the partial images, and generated the training data. The label obtained here was a label given by a specialist. The image obtaining section 111 obtained the label for each of the pixels via an input device.

In step S202, the first learning section 116 caused the first model 121 to learn by deep learning, with use of the training data described above. The following are a learning algorithm and parameter settings.

Validation method: 10-fold cross-validation
Learning algorithm: Fully convolutional networks (FCN)-AlexNet
Fine tuning: PASCAL VOC 2012
Epoch number: 30
Learning rate: 0.0001
Optimizer: Stochastic gradient descent (SGD)
Batch size: 1
Without Dice layer The first model 121 thus caused to learn is referred to as a learned first model 121A. The learned first model 121A is stored in the storage section 12.

<Example of Learning Phase of Second Model>

The following will discuss an Example in which the second model was generated by using the identifying device 1.

In step S301, the image obtaining section 111 configured four labeled chest cross-sectional images of the subject, by using the training data (the partial images of the chest cross-sectional images) which was used for the first model.

In step S302, the image dividing section 113 divided the four labeled chest cross-sectional images by a method similar to that described with reference to FIG. 7, so that 50,625 combinations of the division patterns were generated.

In step S303, the data deriving section 114 derived area ratio data for the 50,625 combinations. Note that area data ratios derived in step S303 were weighted more as a distance between a corresponding region and the chest periphery becomes shorter.

In step S304, the second learning section 117 obtained clinical data of each of the examples. Examples of the clinical data include a result of diagnosis, sex, lung function, autoantibody, alive/dead, and/or a term from diagnosis to death. Further, the second learning section 117 carried out principle component analysis (PCA) with regard to each item of the clinical data. Further, the second learning section 117 carried out interpolation of missing values in the clinical data, by alternating least square (ALS).

In step S305, the second learning section 117 obtained diagnosis contents of each of the examples via the input device.

In step S306, the second learning section 117 generated the following two models as the second model 122, by machine learning.

Learned second model 122A: learned by using 50,625 pieces of area ratio data and diagnosis contents.

Learned second model 122B: learned by using 50,625 pieces of area ratio data, clinical data, and diagnosis contents.

Note that in learning of the learned second models 122A and 122B, the same learning algorithm is applied and parameter settings are as follows:
Learning algorithm: Support vector machine (SVM)
Kernel function: rbf, gaussian, linear, polynomial
Box constraint: 1
Predictor data: standardization
Optimizer: L1 soft margin optimization
Prior probability: 50%
Cost: 1

The learned second models 122A and 122B are stored in the storage section 12.

<Example of Identifying Phase>

The following will discuss accuracy in a test result obtained by using 10% of the "644 examples", as accuracy of the identifying device 1 using the learned first model 121A and the learned second models 122A and 122B which are generated as described above.

FIG. 9 is a chart illustrating accuracy of the identifying device 1.

FIG. 9 shows, in an upper part thereof, the accuracy of the learned first model 121A. As shown in the upper part of FIG. 9, among pixels of IPF images and pixels of Non-IPF images in correct answers, 96% of these pixels were correctly determined to belong to "IPF image" or "Non-IPF image" by using the learned first model 121A.

Further, FIG. 9 shows, in a lower part thereof, an accuracy and other items of the identifying device 1 with use of the learned second model 122A having learned by using the area ratio data and an accuracy of the identifying device 1 with use of the learned second model 122B having learned by using the area ratio data and the clinical data. Note here that in a case where the probability value outputted as an identification result by the identifying device 1 is not more than a threshold value, it is diagnosed that a subject has IPF, whereas in a case where the probability is less than the threshold value, it is diagnosed that a subject does not have IPF.

The item "Accuracy" is a total ratio of cases where (i) an example case actually diagnosed as IPF is diagnosed as IPF by using the identifying device 1 or (ii) an example case actually diagnosed as non-IPF is diagnosed as non-IPF by the identifying device 1, with respect to cases actually diagnosed as interstitial pneumonia which is IPF or non-IPF.

The item "Sensitivity" is a ratio of cases diagnosed as IPF by using the identifying device 1 with respect to cases actually diagnosed as IPF.

The item "Specificity" is a ratio of cases diagnosed as non-IPF by using the identifying device 1 with respect to cases actually diagnosed as non-IPF.

The item "Positive Predictive Value (PPV)" is a ratio of cases actually diagnosed as IPF with respect to cases diagnosed as IPF by using the identifying device 1.

The item "Negative Predictive Value (NPV)" is a ratio of cases actually diagnosed as non-IPF with respect to cases diagnosed as non-IPF by using the identifying device 1.

The item "K Coefficient (Cohen's Kappa)" indicates a degree of coincidence between actual diagnosis results and results of diagnosis by the identifying device 1.

It is clear that in each of the items shown in the lower part of FIG. 9, the accuracy obtained by using the learned second model 122B is higher than that by using the learned second model 122A. Note that it has been known among an international medical specialist team involved in MDD diagnosis that the "K coefficient" is approximately 0.60. Accordingly, in a case where the learned second models 122A and 122B are used, the K coefficient becomes higher than that in the MDD diagnosis.

<Configuration Example of Identifying Device 1>

Functional blocks of the identifying device 1 (particularly, the image obtaining section 111, the breakup section 112, the image dividing section 113, the data deriving section 114, the identifying section 115, the first learning section 116, and the second learning section 117) can be realized by a logic circuit (hardware) provided in an integrated circuit (IC chip) or the like or can be alternatively realized by software. In the latter case, the identifying device 1 may be in the form of, for example, a computer (electronic calculator).

Figure 10:
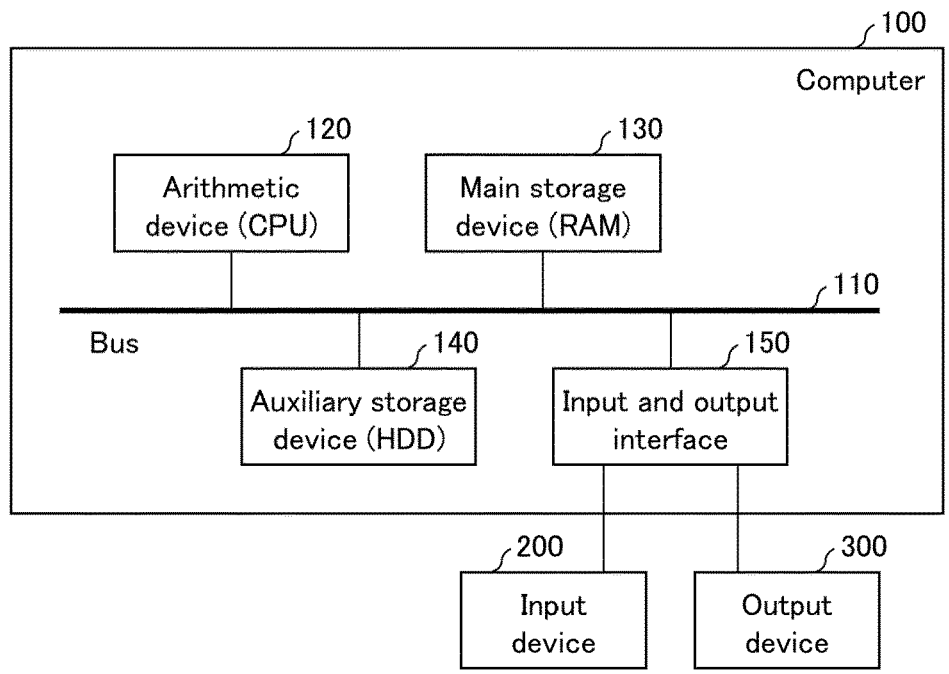
FIG. 10 is a block diagram illustrating a configuration of a computer which functions as the identifying device illustrated in FIG. 1.

FIG. 10 is a block diagram illustrating a configuration of a computer 100 which is usable as the identifying device 1. The computer 100 includes an arithmetic device 120, a main storage device 130, an auxiliary storage section 140, and an input and output interface 150, which are connected to each other via a bus 110, as illustrated in FIG. 10. Examples of the device usable as the arithmetic device 120 encompass a processor such as a central processing unit (CPU). Further, examples of a device usable as the main storage device 130 encompass a memory such as a semiconductor random access memory (RAM). Furthermore, examples of a device usable as the auxiliary storage section 140 encompass a hard disc drive.

To the input and output interface 150, an input device 200 and an output device 300 are connected, as illustrated in FIG. 10. For example, correct answer data as the training data is inputted via the input device 200 connected to the input and output interface 150. Examples of the input device 200 encompass a keyboard and a mouse. The output device 300 connected to the input and output interface 150 can be, for example, a display configured to display an identification result.

The auxiliary storage section 140 stores various programs for causing the computer 100 to operate as the identifying device 1. Specifically, the auxiliary storage device 140 stores programs for causing the computer to carry out the identification process S1, the first learning process S2, and the second learning process S3 which are described above.

The arithmetic device 120 causes the programs stored in the auxiliary storage section 140 to be loaded in the main storage device 130. Then, the arithmetic device 120 causes the computer 100 to function as the identifying device 1 by executing instructions contained in the programs loaded in the main storage device 130. The main storage device 130 also functions as a storage section 12 in which the first model 121 and the second model 122 are stored.

Note that although the description here dealt with a configuration in which the computer 100 is caused to function as the identifying device 1 by using the above programs stored in the auxiliary storage section 140 which is an internal storage medium, an embodiment of the present invention is not limited to such a configuration. In other words, it is possible to employ a configuration in which the computer 100 is caused to function as the identifying device 1 by using the programs stored in an external storage medium. Examples of the external storage medium encompass a computer-readable "non-transitory tangible medium" such as a tape, a disk, a card, a semiconductor memory, and a programmable logic circuit.

Alternatively, the programs can be supplied to or made available, via a communication network, to the computer 100 which is configured to be connectable with the communication network. The communication network only needs to be capable of transmitting the programs, and is not particularly limited. Note that the present invention can also be achieved in the form of a computer data signal in which the programs are embodied via electronic transmission and which is embedded in a carrier wave.

Effects of Embodiment 1

The identifying device 1 in accordance with Embodiment 1 can more accurately extract pixels indicative of an IPF image, since the identifying device 1 determines, by using the learned first model, which one of a plurality of categories including categories of "IPF image" and "Non-IPF image" each pixel in a plurality of chest cross-sectional images of a subject belongs to. Further, the identifying device 1 in accordance with Embodiment 1 outputs an identification result, by (i) first dividing the chest cross-sectional images in n^m combinations of division patterns (into a plurality of regions) including regions from a region showing a chest center to a region showing a chest periphery, (ii) deriving area ratio data from each of the plurality of regions, which area ratio data includes an area ratio between pixels indicative of an IPF image and pixels indicative of a Non-IPF image, and (iii) inputting n^m pieces of the area ratio data to the learned second model. As a result, Embodiment 1 makes it possible to more accurately identify the possibility of IPF in a human lung field.

Embodiment 2

The following will discuss another embodiment of the present invention. For convenience of description, members having functions identical to those discussed in Embodiment 1 are assigned identical referential numerals, and their descriptions are omitted here.

<Configuration of Learning Device 2>

Figure 11:
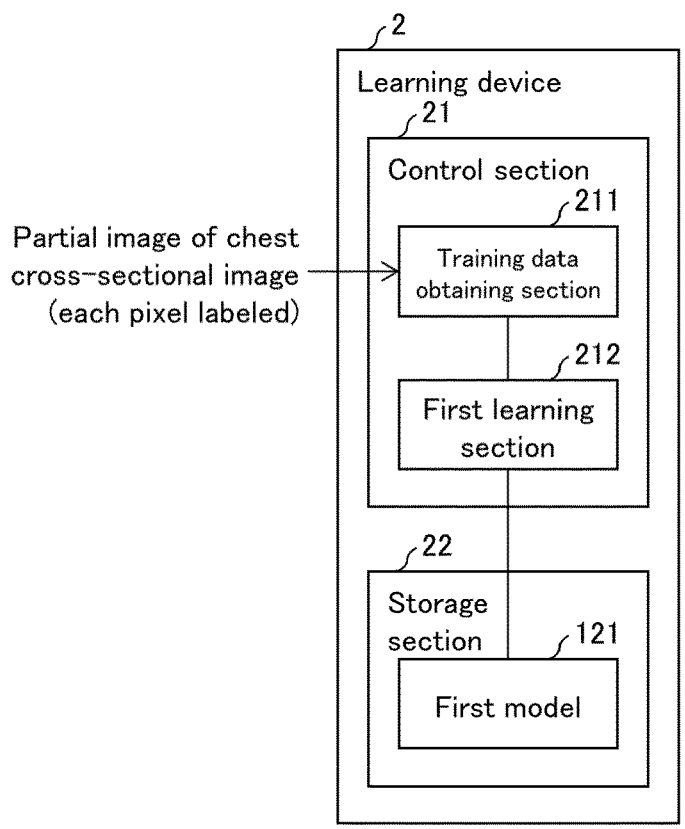
FIG. 11 is a block diagram illustrating a functional configuration of a learning device in accordance with Embodiment 2 of the present invention.

FIG. 11 is a diagram illustrating a functional block configuration of a learning device 2 in accordance with Embodiment 2 of the present invention. The learning device 2 is a device for causing a first model 121 for use in an identifying device 1 in accordance with Embodiment 1 of the present invention to learn. In FIG. 11, the learning device 2 includes a control section 21 and a storage section 22. The control section 21 includes a training data obtaining section 211 and a first learning section 212. In the storage section 22, the first model 121 is stored.

The training data obtaining section 211 obtains, as training data, partial images of chest cross-sectional images of a subject. The partial images each are an image in which one of a plurality of categories including "IPF image" and "Non-IPF image" is attached to each pixel. In other words, the training data obtaining section 211 obtains labeled partial images of the chest cross-sectional images of the subject.

The first learning section 212 causes the first model 121 to learn by using the labeled partial images as the training data. The first learning section 212 is configured in a similar manner to the first learning section 116 in Embodiment 1, and therefore a detailed description thereof will not be repeated here.

<Operation of Learning Device 2>

The learning device 2 operates as with the identifying device 1 in the first learning process S2 which is described with reference to FIG. 3.

<Configuration Example of Learning Device 2>

Functional blocks of the learning device 2 (particularly, the training data obtaining section 211, and the first learning section 212) can be realized by a logic circuit (hardware) provided in an integrated circuit (IC chip) or the like or can be alternatively realized by software. In the latter case, the identifying device 1 may be in the form of, for example, a computer 100 as illustrated in FIG. 10.

The computer 100 is configured as described in Embodiment 1, and therefore a detailed description thereof will not be repeated here. Note, however, that the auxiliary storage section 140 stores various programs for causing the computer 100 to operate as the learning device 2. Specifically, the auxiliary storage device 140 stores programs for causing the computer 100 to carry out the first learning process S2 which is described earlier. Further, the arithmetic device 120 causes the programs stored in the auxiliary storage section 140 to be loaded in the main storage device 130. Then, the arithmetic device 120 causes the computer 100 to function as the learning device 2 by executing instructions contained in the programs loaded in the main storage device 130. The main storage device 130 also functions as a storage section 22 in which the first model 121 is stored.

Effects of Embodiment 2

The learning device 2 in accordance with Embodiment 2 causes the first model for use in the identifying device 1 of Embodiment 1 to learn as described above. As a result, Embodiment 2 allows the identifying device 1 of Embodiment 1 to have an improved accuracy in determining which one of a plurality of categories including a category of "IPF image" each pixel in a plurality of chest cross-sectional images of a subject belongs to.

Embodiment 3

The following will discuss still another embodiment of the present invention. For convenience of description, members having functions identical to those discussed in Embodiment 1 or 2 are assigned identical referential numerals, and their descriptions are omitted here.

Figure 12:
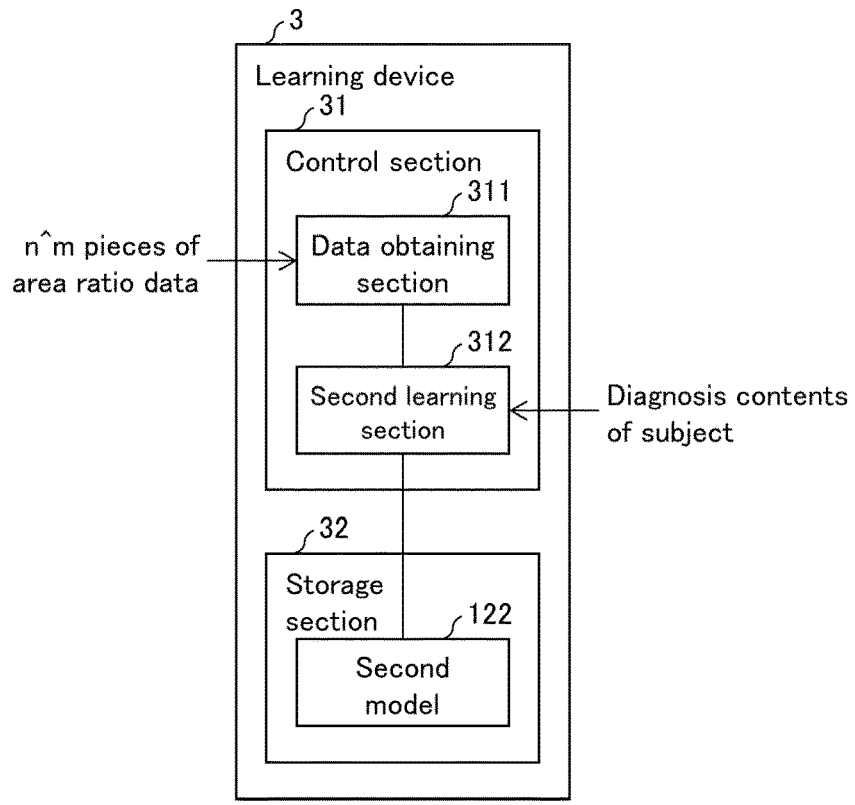
FIG. 12 is a block diagram illustrating a functional configuration of a learning device in accordance with Embodiment 3 of the present invention.

FIG. 12 is a diagram illustrating a functional block configuration of a learning device 3 in accordance with Embodiment 3 of the present invention. The learning device 3 is a device for causing a second model 122 for use in an identifying device 1 in accordance with Embodiment 1 of the present invention to learn. In FIG. 12, the learning device 3 includes a control section 31 and a storage section 32. The control section 31 includes a data obtaining section 311 and a second learning section 312. In the storage section 32, the second model 122 is stored.

The data obtaining section 311 obtains area ratio data for each of a plurality of regions from a region showing a chest center to a region showing a chest periphery into which each of chest cross-sectional images of a subject is divided and which includes regions from a region showing a chest center to a region showing a chest periphery. The area ratio data here includes an area ratio between (i) pixels which are determined to belong to "IPF image" and (ii) pixels which are determined to belong to "Non-IPF image" in each of the plurality of regions, the area ratio being derived from each of the plurality of regions.

The second learning section 312 causes the second model 122 to learn by using the area ratio data, clinical data, and information indicating a possible lesion of the subject. The second learning section 312 is configured in a similar manner to the second learning section 117 in Embodiment 1, and therefore a detailed description thereof will not be repeated here.

<Operation of Learning Device 3>

Figure 13:
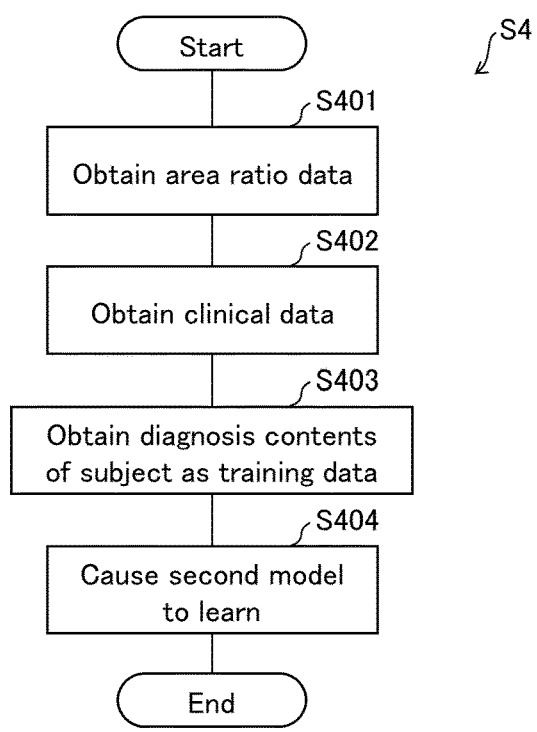
FIG. 13 is a flowchart illustrating an operation in which the learning device in accordance with Embodiment 3 of the present invention learns a second model.

FIG. 13 is a flowchart illustrating a second learning process S4 in which the learning device 3 causes the second model to learn.

In step S401, the data obtaining section 311 obtains area ratio data derived from each of a plurality of regions into which each of chest cross-sectional images of a subject is divided and which include regions from a region showing a chest center to a region showing a chest periphery.

In step S402, the second learning section 312 obtains clinical data.

In step S403, the second learning section 312 obtains, as training data, diagnosis contents of the subject.

In step S404, the second learning section 312 causes the second model to learn by using the area ratio data, the clinical data, and the diagnosis contents of the subject.

Details of processing in steps S402 to S404 are similar to those in steps S304 to S306 described in Embodiment 1, and therefore a detailed description thereof will not be repeated here.

<Configuration Example of Learning Device 3>

Functional blocks of the learning device 3 (particularly, the data obtaining section 311, and the second learning section 312) can be realized by a logic circuit (hardware) provided in an integrated circuit (IC chip) or the like or can be alternatively realized by software. In the latter case, the identifying device 1 may be in the form of, for example, a computer 100 as illustrated in FIG. 10.

The computer 100 is configured as described in Embodiment 1, and therefore a detailed description thereof will not be repeated here. Note, however, that the auxiliary storage section 140 stores various programs for causing the computer 100 to operate as the learning device 3. Specifically, the auxiliary storage device 140 stores programs for causing the computer 100 to carry out the second learning process S4 which is described earlier. Further, the arithmetic device 120 causes the programs stored in the auxiliary storage section 140 to be loaded in the main storage device 130. Then, the arithmetic device 120 causes the computer 100 to function as the learning device 3 by executing instructions contained in the programs loaded in the main storage device 130. The main storage device 130 also functions as a storage section 32 in which the second model 122 is stored.

Effects of Embodiment 3

With the above-described configuration, the learning device 3 in accordance with Embodiment 3 can cause the second model for use in the identifying device 1 of Embodiment 1 to learn. As a result, Embodiment 3 allows the identifying device 1 of Embodiment 1 to have an improved accuracy in identification of a possible lesion in a human lung field.

[Variation]

Each of the Embodiments described above has been described on an assumption that a specific disease is IPF. Note however that the specific disease is not limited to IPF, but can be any other disease in a lung field.

Each of the Embodiments described above has dealt with an example in which FCN-AlexNet is used in deep learning for learning of the first model. Note however that learning of the first model can be carried out by using another deep learning algorithm. Alternatively, learning of the first model can be carried out by using machine learning which is different from deep learning. Meanwhile, although it is described that images to be inputted to the first model is partial images of chest cross-sectional images, it is possible to have a configuration in which the images to be inputted to the first model is complete chest cross-sectional images.

Each of the Embodiments described above has dealt with an example in which a support vector machine is used for machine learning that is different from deep learning, in learning of the second model. Note however that learning of the second model can be carried out by using another algorithm of machine learning that is different from deep learning. Alternatively, learning of the second model can be carried out by deep learning. Meanwhile, although each of the Embodiments described above has dealt with an example in which the second model is caused to learn by using training data, the second model can be caused to learn by machine learning without use of training data. In this case, step S305 of FIG. 4 and step S403 of FIG. 13 do not need to carry out processing for obtaining diagnosis contents of a subject.

Note that in learning of at least one of the first model and the second model, it is possible to use, for example, any of the following machine learning techniques or a combination thereof, other than the above-described FCN-AlexNet or a support vector machine. However, such specific techniques by no means limit any configuration of embodiments of the present invention.

Random forests

Generative adversarial networks (GAN)

Clustering

Inductive logic programming (ILP)

Genetic programming (GP)

Bayesian network (BN)

Neural network (NN)

In a case where a neural network is used, input data should be processed in advance for input into the neural network. It is possible to apply, to such processing, a method such as data augmentation in addition to arranging data in a one-dimensional array or a multidimensional array.

Further, in a case where the neural network is used, it is possible to use a convolutional neural network (CNN) including convolution processing or a recurrent neural network (RNN) containing recursive processing. In a case where the CNN is used, more specifically, the neural network can be configured to include, as one or more layers, a convolution layer(s) in (each of) which a convolution operation is performed, and to carry out a filtering operation (product-sum operation) with respect to input data which is inputted to the convolution layer(s). Further, in a case where the filtering operation is carried out, it is possible to also use processing such as padding, or to use a stride width which is appropriately set.

Furthermore, it is possible to use, as the neural network, a multilayer or super multilayer neural network having several tens to several thousands of layers.

In the above Embodiment 1, the identifying device 1 does not necessarily need to include the first learning section 116 and the second learning section 117. In this case, the first model 121 generated by the learning device 2 of Embodiment 2 and the second model 122 generated by the learning device 3 of Embodiment 3 are stored in the storage section 12 of the identifying device 1.

The learning device 2 and the learning device 3 which are described above can be realized by one computer. In other words, the learning device 2 may further include the functional blocks of the learning device 3.

Each of the Embodiments described above has been described on the assumption that a unit element to which one of the plurality of categories is attached corresponds to one pixel. However, the unit element in each of the Embodiments is not limited to one pixel but may be made of a plurality of pixels.

Each of the Embodiments described above has mainly dealt with an example in which with regard to a subject of one case, a plurality of chest cross-sectional images are obtained. Each of the Embodiments described above is not limited to such an example, and is applicable also to a case where one chest cross-sectional image of a subject of one case is obtained.

Each of the Embodiments described above has dealt with an example in which the plurality of categories include "IPF image" (first category), "Non-IPF image" (second category), "normal lung field" and "outside lung field". Note however that the plurality of categories only need to include at least the first category, and the other categories are not necessarily limited to the categories described as examples.

Each of the Embodiments described above has dealt with an example in which the image dividing section 113 divides one or more chest cross-sectional images in a plurality of division patterns (into a plurality of regions). Note however that the number of the division patterns is not limited to two or more but can be one.

Each of the Embodiments described above has dealt with an example in which the data which is associated with the possible lesion and is derived with regard to each of the plurality of regions is the area ratio data between (i) unit elements determined to belong to the first category and (ii) unit elements determined to belong to the second category. Note however that the data associated with the possible lesion is not limited to the area ratio data. For example, the data associated with the possible lesion can be an area of unit elements determined to belong to the first category or an area of unit elements determined to belong to the second category.

Aspects A of the present invention can also be expressed as follows:

In order to solve the above problems, an identifying device in accordance with an aspect of the present invention is configured to include: an image obtaining section configured to obtain a chest cross-sectional image of a subject; a breakup section configured to determine which one of a plurality of categories each of unit elements of the chest cross-sectional image belongs to, the unit elements being obtained by breaking up the chest cross-sectional image, the plurality of categories including a first category indicating the presence of a possible lesion in a lung field; an image dividing section configured to divide the chest cross-sectional image into a plurality of regions from a region showing a chest center to a region showing a chest periphery; a data deriving section configured to derive data associated with the possible lesion, with regard to each region of the plurality of regions, the data being derived on the basis of a category which each of the unit elements in the each region is determined to belong to among the plurality of categories; and an identifying section configured to output an identification result, which is a result of identification of the possible lesion in the lung field of the subject with reference to the data derived from the each region included in the plurality of regions.

The above configuration makes it possible to more accurately determine a category for each unit element into which the chest cross-sectional image of the subject is broken up. Further, in the above configuration, since reference is made to data derived from each of the plurality of regions obtained by dividing the chest cross-sectional image into regions from the region showing the chest center to the region showing the chest periphery, it is possible to more accurately identify a possible lesion in a human lung field.

In order to solve the above problems, a method in accordance with an aspect of the present invention is a method of identifying a possible lesion of a subject by using an identifying device, the method including the steps of: obtaining a chest cross-sectional image of the subject; determining which one of a plurality of categories each of unit elements of the chest cross-sectional image belongs to, the unit elements being obtained by breaking up the chest cross-sectional image, the plurality of categories including a first category indicating the presence of a possible lesion in a lung field; dividing the chest cross-sectional image into a plurality of regions from a region showing a chest center to a region showing a chest periphery; deriving data associated with the possible lesion, with regard to each region of the plurality of regions, the data being derived on the basis of a category which each of the unit elements in the each region is determined to belong to among the plurality of categories; and outputting an identification result, which is a result of identification of the possible lesion in the lung field of the subject with reference to the data derived from the each region included in the plurality of regions.

The above configuration brings about advantageous effects similar to those of the identifying device described above.

In order to solve the above problems, a program in accordance with an aspect of the present invention is a program for causing a computer to function as the identifying device described above, the program causing the computer to function as each of the foregoing sections.

The above configuration brings about advantageous effects similar to those of the identifying device described above.

The identifying device in accordance with an aspect of the present invention is preferably configured such that the breakup section determines which one of the plurality of categories each of the unit elements belongs to, in each partial image constituting the chest cross-sectional image.

In the above configuration, an image size to be processed is reduced. This makes it possible to reduce processing load for determining which one of the plurality of categories each of the unit elements belongs to.

The identifying device in accordance with an aspect of the present invention is preferably configured such that the breakup section determines a category of each of the unit elements by using a first model, the first model having learned so as to output one of the plurality of categories for each of the unit elements in an input image in a case where at least a part of the chest cross-sectional image is inputted.

The above configuration makes it possible to more accurately determine the category of each of the unit elements.

The identifying device in accordance with an aspect of the present invention is preferably configured such that the identifying section outputs the identification result by using a second model, the second model having learned so as to output the identification result in a case where data derived from each of the plurality of regions is inputted.

The above configuration makes it possible to output a more accurate identification result.

The identifying device in accordance with an aspect of the present invention is preferably configured such that: the plurality of categories include the first category and a second category, the first category indicating the presence of the possible lesion associated with the specific disease in the lung field and the second segment indicating presence of another possible lesion that is associated with a disease different from the specific disease in the lung field; and the data deriving section derives, as the data, an area ratio from each of the plurality of regions, the area ratio being a ratio of an area of unit elements determined to belong to the first category in the each region and an area of unit elements determined to belong to the second category.

The above configuration makes it possible to output a more accurate identification result based on the area ratio.

The identifying device in accordance with an aspect of the present invention is preferably configured such that: the image obtaining section obtains, as the chest cross-sectional image, two or more of a plurality of chest cross-sectional images which are obtained by capturing images of a chest of the subject with a predetermined slice thickness.

The above configuration makes it possible to output a more accurate identification result, since reference is made to the data derived from the plurality of regions obtained by dividing each of the plurality of chest cross-sectional images.

The identifying device in accordance with an aspect of the present invention is preferably configured such that: the image dividing section divides the chest cross-sectional image into the plurality of regions in n ways (where n is an integer of not less than 2) so as to obtain n sets of the plurality of regions, the n sets of the plurality of regions being different from each other in at least one or both of (i) the number of divisional regions and (ii) positions of borders between adjacent regions; the data deriving section derives the data from each of the n sets of the plurality of regions; and the identifying section outputs the identification result with reference to the data derived from each of the n sets of the plurality of regions.

The above configuration makes it possible to output a more accurate identification result since reference is made to more data for one subject.

The identifying device in accordance with an aspect of the present invention is preferably configured such that the identifying section outputs the identification result, with further reference to clinical data of the subject in addition to the data.

The above configuration makes it possible to output a more accurate identification result, additionally taking into account an element resulting from the clinical data The identifying device in accordance with an aspect of the present invention is preferably configured to further include: a first learning section, wherein the image obtaining section is configured to obtain, as training data, an image showing at least a part of the chest cross-sectional image of the subject, the image including unit elements to each of which one of the plurality of categories including the first category is attached, and wherein the first learning section is configured to cause the first model to learn by using the training data so that in a case where the image showing at least the part of the chest cross-sectional image is inputted, the first model outputs one of the plurality of categories for each of the unit elements in the image, the first model being intended for use by the breakup section.

The above configuration makes it possible to accurately generate the first model, which is intended for use in determining the category of each of the unit elements, based on the training data.

The identifying device in accordance with an aspect of the present invention is preferably configured to further include: a second learning section configured to cause the second model to learn, the second model being intended for use by the identifying section, the second model being configured to output the identification result which is a result of identification of the possible lesion in the chest of the subject in a case where the data derived from each of the plurality of regions is inputted.

The above configuration makes it possible to more accurately generate the second model for use in outputting the identification result.

The identifying device in accordance with an aspect of the present invention is preferably configured such that: the first category is a category indicating the presence of possible idiopathic pulmonary fibrosis (IPF); and the identifying section outputs, as the identification result, information indicating the possibility that the subject has IPF.

The above configuration makes it possible to more accurately identify the possibility that the subject has IPF.

In order to solve the above problems, a learning device in accordance with an aspect of the present invention includes: a training data obtaining section configured to obtain, as training data, an image showing at least a part of a chest cross-sectional image of a subject, the image including unit elements to each of which one of a plurality of categories including a first category is attached, the first category indicating the possibility that the subject has a possible lesion; and a first learning section configured to cause a first model to learn by using the training data so that in a case where the image showing at least the part of the chest cross-sectional image is inputted, the first model outputs one of the plurality of categories for each of the unit elements in the image.

The above configuration makes it possible to more accurately generate the first model based on the training data, the first model being intended for use in determining the category of each of the unit elements in the identifying device described above.

In order to solve the above problems, a method in accordance with an aspect of the present invention is a method of causing a first model to learn by using the learning device, the method including the steps of: obtaining, as training data, an image showing at least a part of a chest cross-sectional image of a subject, the image including unit elements to each of which one of a plurality of categories including a first category is attached, the first category indicating the possibility that the subject has a possible lesion; and causing the first model to learn data so that in a case where the image showing at least the part of the chest cross-sectional image is inputted, the first model outputs one of the plurality of categories for each of the unit elements in the image.

The above configuration brings about an advantageous effect similar to that of the learning device described above.

In order to solve the above problems, a program in accordance with an aspect of the present invention is a program for causing a computer to function as the learning device described above, the program causing the computer to function as each of the foregoing sections.

The above configuration brings about an advantageous effect similar to that of the learning device described above.

In order to solve the above problems, a learning device in accordance with an aspect of the present invention includes: a data obtaining section configured to obtain data associated with a possible lesion in a lung field, the data being calculated on the basis of a category attached to each of unit elements in each of a plurality of regions into which a chest cross-sectional image of a subject has been divided, the plurality of regions including regions from a region showing a chest center to a region showing a chest periphery, the chest cross-sectional image including unit elements to each of which one of the plurality of categories is attached, the plurality of categories including a first category indicating the presence of the possible lesion; and a second learning section configured to cause a second model to learn, the second model being configured to output an identification result, in a case where the data is inputted, the identification result being a result of identification of the possible lesion in the lung field of the subject.

The above configuration makes it possible to accurately generate the second model for use in outputting the identification result in the above identifying device.

In order to solve the above problems, a method in accordance with an aspect of the present invention is a method for causing a second model to learn by using the learning device, the method including the steps of: obtaining data associated with a possible lesion in a lung field, the data being calculated on the basis of a category attached to each of unit elements in each of a plurality of regions into which a chest cross-sectional image of a subject has been divided, the plurality of regions including regions from a region showing a chest center to a region showing a chest periphery, the chest cross-sectional image including unit elements to each of which one of the plurality of categories is attached, the plurality of categories including a first category indicating the presence of the possible lesion; and causing a second model to learn, the second model being configured to output an identification result in a case where the data is inputted, the identification result being a result of identification of the possible lesion in the lung field of the subject.

The above configuration brings about an advantageous effect similar to that of the learning device described above.

In order to solve the above problems, a program in accordance with an aspect of the present invention is a program for causing a computer to function as the learning device described above, the program causing the computer to function as each of the foregoing sections.

The above configuration brings about an advantageous effects similar to that of the learning device described above.

Aspects B of the present invention can also be expressed as follows:

In order to solve the above problems, an identifying device in accordance with an aspect of the present invention is an identifying device including: an image obtaining section configured to obtain a chest cross-sectional image of a subject; a segmentation section configured to classify, into a plurality of segments, unit elements of the chest cross-sectional image, the plurality of segments including a first segment indicating presence of a possible lesion in a lung field; an image dividing section configured to divide the chest cross-sectional image into a plurality of regions from a region showing a chest center to a region showing a chest periphery in n ways so as to obtain n sets of the plurality of regions, where n is an integer of not less than 2, the n sets of the plurality of regions being different from each other in at least one or both of (i) the number of divisional regions and (ii) positions of borders between adjacent regions; a data deriving section configured to derive data associated with the possible lesion, with regard to each region of the n sets of the plurality of regions, the data being derived on a basis of a segment of unit elements in the each region among the plurality of segments; and an identifying section configured to output an identification result, which is a result of identification of the possible lesion in the lung field of the subject with reference to the data derived from the each region included in the n sets of the plurality of regions.

The identifying device in accordance with an aspect of the present invention is preferably configured such that: the image obtaining section obtains, as the chest cross-sectional image, two or more of a plurality of chest cross-sectional images which are obtained by capturing images of a chest of the subject with a predetermined slice thickness.

The identifying device in accordance with an aspect of the present invention is preferably configured such that: the plurality of segments include the first segment and a second segment, the first segment indicating the presence of the possible lesion associated with the specific disease in the lung field and the second segment indicating presence of another possible lesion that is associated with a disease different from the specific disease in the lung field; and the data deriving section derives, as the data, a ratio of an area of the first segment and an area of the second segment in each region of the n sets of the plurality of regions.

The identifying device in accordance with an aspect of the present invention is preferably configured such that: the identifying section outputs the identification result, with further reference to clinical data of the subject in addition to the data.

The identifying device in accordance with an aspect of the present invention is preferably configured such that: the first segment is a segment indicating presence of possible idiopathic pulmonary fibrosis (IPF); and the identifying section outputs, as the identification result, information indicating possibility that the subject has IPF.

In order to solve the above problems, a learning device in accordance with an aspect of the present invention is a learning device including: a training data obtaining section configured to obtain, as training data, an image showing at least a part of a chest cross-sectional image of a subject, the image having unit elements classified into a plurality of segments including a first segment indicating presence of a possible lesion in a lung field; and a first learning section configured to cause a first model to learn by using the training data so that in a case where the image showing at least the part of the chest cross-sectional image is inputted, the first model outputs the image having the unit elements classified into the plurality of segments including the first segment.

In order to solve the above problems, a learning device in accordance with an aspect of the present invention is a learning device including: a data obtaining section configured to obtain data associated with a possible lesion in a lung field, the data having been calculated on a basis of a segment of unit elements in each region of n sets of a plurality of regions into which a chest cross-sectional image of a subject is divided in n ways, where n is an integer of not less than 2, the plurality of regions being regions from a region showing a chest center to a region showing a chest periphery, the chest cross-sectional image having unit elements classified into a plurality of segments including a first segment indicating presence of the possible lesion, the segment of the unit elements in each region being among the plurality of segments, the n sets of the plurality of regions being different from each other in at least one or both of (i) the number of divisional regions and (ii) positions of borders between adjacent regions; and a second learning section configured to cause the second model to learn, the second model being configured to output an identification result as a result of identifying the possible lesion in the lung field of the subject in case where the data is inputted.

In order to solve the above problems, a method in accordance with an aspect of the present invention is a method of identifying a possible lesion of a subject by using an identifying device, the method including the steps of: obtaining a chest cross-sectional image of the subject; classifying, into a plurality of segments, unit elements of the chest cross-sectional image, the plurality of segments including a first segment indicating presence of the possible lesion in the lung field; dividing the chest cross-sectional image into a plurality of regions from a region showing a chest center to a region showing a chest periphery in n ways so as to obtain n sets of the plurality of regions, where n is an integer of not less than 2, the n sets of the plurality of regions being different from each other in at least one or both of (i) the number of divisional regions and (ii) positions of borders between adjacent regions; deriving data associated with the possible lesion, with regard to each region of the plurality of regions, the data being derived on a basis of a segment of unit elements in the each region among the plurality of segments; and outputting an identification result, which is a result of identification of the possible lesion in the lung field of the subject with reference to the data derived from the each region included in the plurality of regions.

In order to solve the above problems, a program in accordance with an aspect of the present invention is a program for causing a computer to function as the identifying device described above, the program causing the computer to function as each of the foregoing sections.

In order to solve the above problems, a method in accordance with an aspect of the present invention is a method of causing a first model to learn by using a learning device, the method including the steps of: obtaining, as training data, an image showing at least a part of a chest cross-sectional image of a subject, the image having unit elements classified into segments including a first segment indicating presence of a possible lesion in a lung field; and causing the first model to learn by using the training data so that in a case where the image showing at least the part of the chest cross-sectional image is inputted, the first model outputs the image having the unit elements classified into the plurality of segments including the first segment.

In order to solve the above problems, a program in accordance with an aspect of the present invention is a program for causing a computer to function as the learning device described above, the program causing the computer to function as each of the foregoing sections.

In order to solve the above problems, a method in accordance with an aspect of the present invention is a method of causing a second model to learn by using a learning device, the method including the steps of: obtaining data associated with a possible lesion in a lung field, the data having been calculated on a basis of a segment of unit elements in each region of n sets of a plurality of regions into which a chest cross-sectional image of a subject is divided in n ways, where n is an integer of not less than 2, the plurality of regions being regions from a region showing a chest center to a region showing a chest periphery, the unit elements being unit elements of the chest cross-sectional image classified into a plurality of segments including a first segment indicating presence of the possible lesion, the segment of the unit elements in each region being among the plurality of segments, the n sets of the plurality of regions being different from each other in at least one or both of (i) the number of divisional regions and (ii) positions of borders between adjacent regions; and causing the second model to learn, the second model being configured to output an identification result as a result of identifying the possible lesion in the lung field of the subject in case where the data is inputted.

In order to solve the above problems, a program in accordance with an aspect of the present invention is a program for causing a computer to function as the learning device described above, the program causing the computer to function as each of the foregoing sections.

In order to solve the above problems, a learned model in accordance with an aspect of the present invention is a learned model for causing a computer to function to output an image having unit elements classified into a plurality of segments including a first segment indicating presence of a possible lesion in a lung field, in a case where at least a part of a chest cross-sectional image of a subject is inputted, the learned model including parameters which have learned by using, as training data, an image to which segmentation information is attached, the image showing at least the part of the chest cross-sectional image of the subject, the segmentation information indicating the plurality of segments including the first segment, the parameters having learned so as to reduce a difference between (i) the image which is outputted by the learned model and in which the unit elements are classified and (ii) the image, to which the segmentation information is attached, in the training data.

In order to solve the above problems, a learned model in accordance with an aspect of the present invention is a learned model for causing a computer to function to output an identification result associated with a possible lesion in a lung field of a subject, in a case where data derived on a basis of a plurality of segments including a first segment indicating presence of the possible lesion in the lung field is inputted, the data being derived from each region of a plurality of regions into which a chest cross-sectional image of the subject is divided in n ways so that n sets of the plurality of regions are obtained, where n is an integer of not less than 2, the plurality of regions being regions from a region showing a chest center to a region showing a chest periphery, the n sets of the plurality of regions being different from each other in at least one or both of (i) the number of divisional regions and (ii) positions of borders between adjacent regions.

The learned model in accordance with an aspect of the present invention is preferably configured to further contain parameters which have learned by using, as training data, data to which identification result information indicating an identification result associated with the possible lesion in the lung of the subject is attached, the data being derived on a basis of a plurality of segments including a first segment indicating presence of the possible lesion in the lung field, the data being derived from each region of a plurality of regions into which a chest cross-sectional image of the subject is divided in n ways so that n sets of the plurality of regions are obtained, where n is an integer of not less than 2, the plurality of regions being regions from a region showing a chest center to a region showing a chest periphery, the n sets of the plurality of regions being different from each other in at least one or both of (i) the number of divisional regions and (ii) positions of borders between adjacent regions, the parameters having learned so as to reduce a difference between (i) the identification result outputted by the learned model and (ii) the identification result information in the training data.

In order to solve the above problems, a computer-readable storage medium in accordance with an aspect of the present invention stores any of the programs described above.

In order to solve the above problems, a computer-readable storage medium in accordance with an aspect of the present invention stores any of the learned models described above.

[Supplemental Remarks]

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1 identifying device
2, 3 learning device
11, 21, 31 control section
12, 22, 32 storage section
111 image obtaining section
112 breakup section (segmentation section)
113 image dividing section
114 data deriving section
115 identifying section
116, 212 first learning section
117, 312 second learning section
211 training data obtaining section
311 data obtaining section
100 computer
110 bus
120 arithmetic device
130 main storage device
140 auxiliary storage device
150 input and output interface
200 input device
300 output device

The invention claimed is:

1. An identifying device comprising:
an integrated circuit including logic circuits, wherein the integrated circuit includes; a first logic circuit configured to obtain a chest cross-sectional image of a subject;
a second logic circuit configured to classify, into a plurality of segments, unit elements of the chest cross-sectional image, the plurality of segments including a first segment indicating presence of a possible lesion in a lung field;
a third logic circuit configured to divide the chest cross-sectional image into a plurality of regions from a region showing a chest center to a region showing a chest periphery in n ways so as to obtain n sets of the plurality of regions, where n is an integer of not less than 2, the n sets of the plurality of regions being different from each other in at least one or both of (i) the number of divisional regions and (ii) positions of borders between adjacent regions;
a fourth logic circuit configured to derive data associated with the possible lesion, with regard to each region of the n sets of the plurality of regions, the data being derived on a basis of a segment of unit elements in the each region among the plurality of segments; and
a fifth logic circuit configured to output an identification result, which is a result of identification of the possible lesion in the lung field of the subject with reference to the data derived from the each region included in the n sets of the plurality of regions.

2. The identifying device as set forth in claim 1, wherein:
the first logic circuit obtains, as the chest cross-sectional image, two or more of a plurality of chest cross-sectional images which are obtained by capturing images of a chest of the subject with a predetermined slice thickness.

3. The identifying device as set forth in claim 1, wherein:
the plurality of segments include the first segment and a second segment, the first segment indicating the presence of the possible lesion associated with the specific disease in the lung field and the second segment indicating presence of another possible lesion that is associated with a disease different from the specific disease in the lung field; and
the fourth logic circuit derives, as the data, a ratio of an area of the first segment and an area of the second segment in each region of the n sets of the plurality of regions.

4. The identifying device as set forth in claim 1, wherein:
the fifth logic circuit outputs the identification result, with further reference to clinical data of the subject in addition to the data.

5. The identifying device as set forth in claim 1, wherein:
the first segment is a segment indicating presence of possible idiopathic pulmonary fibrosis (IPF); and
the fifth logic circuit outputs, as the identification result, information indicating possibility that the subject has IPF.

6. A computer-readable storage medium storing a program for causing a computer to function as an identifying device as recited in claim 1, the program causing the computer to function as each of the foregoing logic circuits.

7. A learning device comprising:
an integrated circuit including logic circuits, wherein the integrated circuit includes;
a first logic circuit configured to obtain, as training data, an image showing at least a part of a chest cross-sectional image of a subject, the image having unit elements classified into a plurality of segments including a first segment indicating presence of a possible lesion in a lung field with reference to a pattern of a lung disease and a result of MDD diagnosis; and
a second logic circuit configured to cause a first model to learn by using the training data so that in a case where the image showing at least the part of the chest cross-sectional image is inputted, the first model outputs the image having the unit elements classified into the plurality of segments including the first segment.

8. A computer-readable storage medium storing a program for causing a computer to function as a learning device as recited in claim 7, the program causing the computer to function as each of the foregoing sections.

9. A learning device comprising:
an integrated circuit including logic circuits, wherein the integrated circuit includes;
a first logic circuit configured to obtain data associated with a possible lesion in a lung field, the data having been calculated on a basis of area ratio data and clinical data of a subject, wherein a chest cross-sectional image of the subject is divided into a plurality of regions, the plurality of regions being regions from a region showing a chest center to a region showing a chest periphery, the chest cross-sectional image having pixels being classified into a plurality of segments including a first segment indicating presence of the possible lesion, the area ratio data showing an area ratio between (i) pixels which are determined to belong to a IPF (idiopathic pulmonary fibrosis) image in the region and (ii) pixels which are determined not to belong to the IPF image in that region; and
a second logic circuit configured to cause the second model to learn, the second model being configured to output an identification result as a result of identifying the possible lesion in the lung field of the subject in case where the data is inputted.

10. A computer-readable storage medium storing a program for causing a computer to function as a learning device as recited in claim 9, the program causing the computer to function as each of the foregoing logic circuits.

11. A method of identifying a possible lesion of a subject by using an identifying device, the method comprising the steps of:

obtaining a chest cross-sectional image of the subject;

classifying, into a plurality of segments, unit elements of the chest cross-sectional image, the plurality of segments including a first segment indicating presence of the possible lesion in the lung field;

dividing the chest cross-sectional image into a plurality of regions from a region showing a chest center to a region showing a chest periphery in n ways so as to obtain n sets of the plurality of regions, where n is an integer of not less than 2, the n sets of the plurality of regions being different from each other in at least one or both of (i) the number of divisional regions and (ii) positions of borders between adjacent regions;

deriving data associated with the possible lesion, with regard to each region of the plurality of regions, the data being derived on a basis of a segment of unit elements in the each region among the plurality of segments; and outputting an identification result, which is a result of identification of the possible lesion in the lung field of the subject with reference to the data derived from the each region included in the plurality of regions.

12. A method of causing a first model to learn by using a learning device, the method comprising the steps of:

obtaining, as training data, an image showing at least a part of a chest cross-sectional image of a subject, the image having unit elements classified into segments including a first segment indicating presence of a possible lesion in a lung field with reference to a pattern of a lung disease and a result of MDD diagnosis; and causing the first model to learn by using the training data so that in a case where the image showing at least the part of the chest cross-sectional image is inputted, the first model outputs the image having the unit elements classified into the plurality of segments including the first segment.

13. A method of causing a second model to learn by using a learning device, the method comprising the steps of:

obtaining data associated with a possible lesion in a lung field, the data having been calculated on a basis of area ratio data and clinical data of a subject, wherein a chest cross-sectional image of the subject is divided into a plurality of regions, the plurality of regions being regions from a region showing a chest center to a region showing a chest periphery, the chest cross-sectional image having pixels being classified into a plurality of segments including a first segment indicating presence of the possible lesion, the area ratio data showing an area ratio between (i) pixels which are determined to belong to a IPF (idiopathic pulmonary fibrosis) image in the region and (ii) pixels which are determined not to belong to the IPF image in that region; and causing the second model to learn, the second model being configured to output an identification result as a result of identifying the possible lesion in the lung field of the subject in case where the data is inputted.

14. A computer-readable storage medium storing a learned model for causing a computer to function to output an image having unit elements classified into a plurality of segments including a first segment indicating presence of a possible lesion in a lung field, in a case where at least a part of a chest cross-sectional image of a subject is inputted, the learned model including parameters which have learned by using, as training data, an image to which segmentation information is attached, the image showing at least the part of the chest cross-sectional image of the subject, the segmentation information indicating the plurality of segments including the first segment, the parameters having learned so as to reduce a difference between (i) the image which is outputted by the learned model and in which the unit elements are classified and (ii) the image, to which the segmentation information is attached, in the training data.

15. A computer-readable storage medium storing a learned model for causing a computer to function to output an identification result associated with a possible lesion in a lung field of a subject, in a case where data derived on a basis of a plurality of segments including a first segment indicating presence of the possible lesion in the lung field is inputted, the data being derived from each region of a plurality of regions into which a chest cross-sectional image of the subject is divided in n ways so that n sets of the plurality of regions are obtained, where n is an integer of not less than 2, the plurality of regions being regions from a region showing a chest center to a region showing a chest periphery, the n sets of the plurality of regions being different from each other in at least one or both of (i) the number of divisional regions and (ii) positions of borders between adjacent regions.

16. The computer-readable storage medium as set forth in claim 15, further containing:

parameters which have learned by using, as training data, data to which identification result information indicating an identification result associated with the possible lesion in the lung of the subject is attached, the data being derived on a basis of a plurality of segments including a first segment indicating presence of the possible lesion in the lung field, the data being derived from each region of a plurality of regions into which a chest cross-sectional image of the subject is divided in n ways so that n sets of the plurality of regions are obtained, where n is an integer of not less than 2, the plurality of regions being regions from a region showing a chest center to a region showing a chest periphery, the n sets of the plurality of regions being different from each other in at least one or both of (i) the number of divisional regions and (ii) positions of borders between adjacent regions, the parameters having learned so as to reduce a difference between (i) the identification result outputted by the learned model and (ii) the identification result information in the training data.

* * * * *